US008635446B2

(12) United States Patent
Pelton et al.

(10) Patent No.: US 8,635,446 B2
(45) Date of Patent: Jan. 21, 2014

(54) DISTRIBUTED CRYPTOGRAPHIC MANAGEMENT FOR COMPUTER SYSTEMS

(75) Inventors: Douglas Pelton, Richmond, CA (US); Waeed Sherzai, Martinez, CA (US); Catherine Li, Corte Madera, CA (US); Ruven Schwartz, Minneapolis, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 13/612,355

(22) Filed: Sep. 12, 2012

(65) Prior Publication Data

US 2013/0036301 A1 Feb. 7, 2013

Related U.S. Application Data

(62) Division of application No. 11/270,788, filed on Nov. 8, 2005, now Pat. No. 8,291,224.

(60) Provisional application No. 60/667,186, filed on Mar. 30, 2005.

(51) Int. Cl.
*H04L 29/06* (2006.01)

(52) U.S. Cl.
USPC .......... 713/155

(58) Field of Classification Search
USPC .......... 713/155
See application file for complete search history.

(56) References Cited

U.S. PATENT DOCUMENTS

| | | | |
|---|---|---|---|
| 4,912,762 | A | 3/1990 | Lee |
| 4,918,728 | A | 4/1990 | Matyas et al. |
| 4,941,176 | A | 7/1990 | Matyas et al. |
| 5,007,089 | A | 4/1991 | Matyas et al. |
| 5,103,478 | A | 4/1992 | Matyas et al. |
| 5,931,917 | A | 8/1999 | Nguyen et al. |
| 5,996,076 | A | 11/1999 | Rowney et al. |
| 6,061,791 | A | 5/2000 | Moreau et al. |
| 6,072,870 | A | 6/2000 | Nguyen et al. |

(Continued)

FOREIGN PATENT DOCUMENTS

| | | |
|---|---|---|
| EP | 200343 | 11/1986 |
| EP | 0287720 | 10/1988 |

(Continued)

OTHER PUBLICATIONS

Wadaa, et al. Scalable Cryptographic Key Management in Wireless Sensor Networks, Proceedings 24th International Conference on Distributed Computing System Workshops, IEEE Comoput. Soc. Los Alamitos, CA 2004.

(Continued)

*Primary Examiner* — Teshome Hailu
(74) *Attorney, Agent, or Firm* — Merchant & Gould P.C.

(57) ABSTRACT

A distributed cryptographic management system can include: a central key management service accessible through the network and having a database associated therewith; an approval module programmed to receive approval for any client machines connectable to the network and applications associated with the client machines, the database storing records for the client machines, and a key management domain being defined by all approved client machines and applications; and an agent module programmed to provide key management agents, wherein the key management agents are transferable and installable on any of the approved client machines and applications within the key management domain.

6 Claims, 30 Drawing Sheets

(56) References Cited

U.S. PATENT DOCUMENTS

| | | | | |
|---|---|---|---|---|
| 6,215,877 | B1 | 4/2001 | Matsumoto | |
| 6,233,565 | B1 * | 5/2001 | Lewis et al. | 705/35 |
| 6,237,096 | B1 | 5/2001 | Bisbee et al. | |
| 6,324,525 | B1 | 11/2001 | Kramer et al. | |
| 6,442,690 | B1 | 8/2002 | Howard, Jr. et al. | |
| 6,658,568 | B1 | 12/2003 | Ginter et al. | |
| 6,978,025 | B1 | 12/2005 | Price, III | |
| 7,054,447 | B1 | 5/2006 | Price, III | |
| 7,529,925 | B2 * | 5/2009 | Harkins | 713/155 |
| 2001/0026619 | A1 | 10/2001 | Howard, Jr. et al. | |
| 2002/0013897 | A1 | 1/2002 | McTernan et al. | |
| 2002/0051539 | A1 | 5/2002 | Okimoto et al. | |
| 2002/0062451 | A1 | 5/2002 | Scheidt et al. | |
| 2002/0083438 | A1 | 6/2002 | So et al. | |
| 2002/0126849 | A1 | 9/2002 | Howard, Jr. et al. | |
| 2002/0131601 | A1 * | 9/2002 | Ninomiya et al. | 380/277 |
| 2002/0178354 | A1 | 11/2002 | Ogg et al. | |
| 2003/0074552 | A1 | 4/2003 | Olkin et al. | |
| 2003/0074555 | A1 | 4/2003 | Fahn et al. | |
| 2003/0147535 | A1 | 8/2003 | Nadooshan et al. | |
| 2003/0167403 | A1 | 9/2003 | McCurley et al. | |
| 2004/0044739 | A1 | 3/2004 | Ziegler | |
| 2004/0064710 | A1 * | 4/2004 | Vainstein | 713/189 |
| 2004/0105549 | A1 | 6/2004 | Suzuki et al. | |
| 2004/0117623 | A1 | 6/2004 | Kalogridis et al. | |
| 2004/0123129 | A1 | 6/2004 | Ginter et al. | |
| 2004/0139320 | A1 * | 7/2004 | Shinohara | 713/168 |
| 2005/0223242 | A1 * | 10/2005 | Nath | 713/193 |
| 2006/0126848 | A1 | 6/2006 | Park et al. | |
| 2006/0236096 | A1 * | 10/2006 | Pelton et al. | 713/155 |

FOREIGN PATENT DOCUMENTS

| | | | |
|---|---|---|---|
| EP | 1241826 | A2 | 9/2002 |
| EP | 1274243 | A2 | 1/2003 |
| WO | 98/52316 | | 11/1998 |
| WO | 99/14679 | | 3/1999 |
| WO | 00/25473 | | 5/2000 |
| WO | 00/45347 | | 8/2000 |
| WO | 01/22322 | A2 | 3/2001 |
| WO | 01/22650 | A2 | 3/2001 |
| WO | 01/22651 | A2 | 3/2001 |
| WO | 02/39224 | A2 | 5/2002 |
| WO | 03/34682 | A1 | 4/2003 |

OTHER PUBLICATIONS

William, P. Cisco System's Simply Certificate Enrollment Protocol. White Paper. Aug. 29, 2003.

Wong, et al. Keystone: A Group Key Management Service. HRL Laboratories, LLC. Malibu, CA, May 2000.

Cungang, et al. Cryptographic Key Management Solution in a Role Hierarchy. Canadian Conference on electrical and Computer Engineering 2004. vol. 1, IEEE. Piscatawa, NJ. 2004.

Lehane, et al. Shared RSA Key Generation in a Mobile Ad hoc Network. MILCOM 2003. 2003 IEEE Military Communications Conference. vol. 2. IEEE. Piscataway, NJ. 2003.

Applied Cryptography and Network Security. Second International conference. ACNS 2004. Lecture Notes in Comput. Sci. vol. 3089. Springer-Verlag, Berlin, Germany. 2004.

Yignjie Wang, et al. An Efficient Key Management for Large Dynamic Groups, Second Annual Conference on Communication Networks and Services Research, IEEE Comput. Soc. Los Alamitos, CA 2004.

Berson, T. Cryptography Everywhere. Advances in Crytology—ASIACRYPT 2000. 6th International Conference on the Theory and Application of Cryptology and Information Security. Lecture notes in Computer Science vol. 1976 Springer-Verlag. Berlin, Germany. 2000.

Oppliger, R. Protecting Key Exchange and management Protocols Against Resource Clogging Attacks. Secure Information Networks. Communications and Multimedia Security. IFIP TC6/TC11 Joint Working Conference on Communications and Multimedia Security. Kluwer Academic Publishers, Norwell, MA. 1999.

Dawson, et al. Key Management in a Non-trusted Distributed Environment. Future Generation Computer Systems. vol. 16. No. 4. Elsevier. Feb. 2000. The Netherlands.

Branstad, et al. Policy-Based Cryptographic Key Management: Experience with the KRP Project. Proceedings DARPA information Survivability Conference and IExposition. DISCEX/00. vol. 1. IEEE Comput. Soc. Las Alamitos, CA. 1999.

Zugaj, A. Cryptographic Key Management in IT Networks. Przeglad Telekomunikacyjny + Wiadomosci Telekomucayjne. vol. 71. No. 10. SIGMA NOT. Poland. 1998.

A New Approach to Crytographic Facility Design. ICL Technical Journal. vol. 8. No. 3. May 1993.

Wang Min. A New Cryptographic Key Management Scheme. Chinese Journal of Computers. vol. 16. No. China. Feb. 1993.

Fullard, R. Cryptographic Key Management. INFOSEC'90. Information Security Symposium Proceedings. CSIR. Pretoria, South Africa. 1990.

Yeh, et al. ESA/390 Integrated Cryptographic Facility: An Overview, IBM Systems Journal. vol. 30. No. 2 1991.

Matyas, et al. A Key Management Scheme Based on Control Vectors. IBM Systems Journal. vol. 30. No. 2 1991.

Patni, C. Smart Technology for Corporate Banking. Smart Card '91. International Exhibition. vol. 2. Agestream Ltd. Peterborough, UK. 1991.

Gerberick, D. Cryptographic Key Management or Strong Network Security Management. SIGSAC Review vol. 8. No. 2. Summer 1990.

Newman, et al. Public Key Management for Network Security. IEEE Network. vol. 1. No. 2 Apr. 1987.

Lennon, et al. Cryptographic PIN Processing in EFT Systems, COMPCON 79 Proceedings Using Microprocessors Extending Our Reach. IEEE. New York. 1979.

Ehrsam, et al. A Cryptographic Key Management Scheme for Implementing the Data Encrypting Standard. IBM Systems Journal. vol. 17. No. 2. 1978.

Perrig, et al. ELK, A New Protocol for Efficient Large-Group Key Distribution. University of California Berkeley, 2001.

Poovendran, R. On the Communication-Storage Minimization for a Class of Secure Multicast Protocols. IEEE Infocom 2001. Dept. of Electrical and Computer Engineering. University of Maryland.

Eddon, et al. Understanding the DCOM Wire Protocol by Analyzing Network DATA Packets. http://www.msdn.co/MSJ/Mar. 1998.

* cited by examiner

380

382

| Certificate Status ID | Enumerated Data Type | |
|---|---|---|
| 0 | CERT_willNotExpire | 382a |
| 1 | CERT_Error | 382b |
| 2 | CERT_willExpire | 382c |
| 3 | CERT_Valid | 382d |
| 4 | CERT_Expired | 382e |
| 5 | CERT_Missing | 382f |
| 6 | CERT_fileOk | 382g |
| 7 | CERT_notReady | 382h |
| 8 | CERT_DBError | 382i |
| 9 | CERT_REQIDError | 382j |
| 10 | CERT_missingPrivKeyHdr | 382k |
| 11 | CERT_missingCertHdr | 382l |
| 12 | CERT_statusFileFail | 382m |
| 13 | CERT_sendFail | 382n |
| 14 | CERT_accessViolation | ... 382t |

| Certificate Request ID | Enumerated data Type |
|---|---|
| 0 | REQ_None = 0, |
| 1 | REQ_Error |
| 2 | REQ_New, |
| 3 | REQ_Send_New, |
| 4 | REQ_Send_New_Error, |
| 5 | REQ_Receive_New, |
| 6 | REQ_Receive_New_Error, |
| 7 | REQ_Renew, |
| 8 | REQ_Send_Renew, |
| 9 | REQ_Send_Renew_Error, |
| 10 | REQ_Receive_Renew, |
| 11 | REQ_Receive_Renew_Error, |
| 12 | REQ_Validate |

```
<?xml version="1.0" encoding="UTF-8" standalone="yes"?>
<!-- PKI CertMan config file 05-30-2002 WSH -->
<!-- Modisification 03/23/03 WSH added password gen tags -->
<!-- Modisification 04/23/03 WSH added requester-approver tags -->

<CertManProperties>
    <Phases>
        <!-- KeyStoreLocation : path where default keystore and intermediate files are built -->
        <!-- KeyStoreFilename : auto or specifiy a filename path -->
        <!-- ppGeneration (PassPhrase generation) : auto, none, usapp:filename -->

        <PROD>
            <Active>False</Active>
            <Format>PEM</Format>
            <KeyStoreLocation>c:\CertMan\certs</KeyStoreLocation>
            <KeyStoreFilename>auto</KeyStoreFilename>
            <CA>WF_CA_CERTS.PEM</CA>
            <reqURL>https://rhone.wellsfargo.com/pkira/beststep</reqURL>
            <ppGeneration>auto</ppGeneration>
        </PROD>
        <STAGING>
            <Active>False</Active>
            <Format>PEM</Format>
            <KeyStoreLocation>c:\CertMan\certs</KeyStoreLocation>
            <KeyStoreFilename>auto</KeyStoreFilename>
            <CA>WF_CA_CERTS.PEM</CA>
            <reqURL>https://rhone.wellsfargo.com/pkira/beststep</reqURL>
            <ppGeneration>auto</ppGeneration>

        </STAGING>
        <ET>
            <Active>False</Active>
            <Format>PEM</Format>
            <KeyStoreLocation>c:\CertMan\certs</KeyStoreLocation>
            <KeyStoreFilename>auto</KeyStoreFilename>
            <CA>WF_CA_CERTS.PEM</CA>
            <reqURL>https://ossinging.wellsfargo.com/pkira/beststep</reqURL>
            <ppGeneration>auto</ppGeneration>
        </ET>
        <IST>
            <Active>False</Active>
            <Format>PEM</Format>
            <KeyStoreLocation>c:\CertMan\certs</KeyStoreLocation>
            <KeyStoreFilename>auto</KeyStoreFilename>
            <CA>WF_CA_CERTS.PEM</CA>
            <reqURL>https://ossinging.wellsfargo.com/pkira/beststep</reqURL>
            <ppGeneration>auto</ppGeneration>
        </IST>
    </Phrases>
```

```
<!-- GLOBAL PARAMETER SECTIONS -->

    <!-- Certificate purpose s e c t i o n -->
    <!-- Purpose: SSLClientAuth, SSLServerAuth, SSLMutualAuth, CodeSigning, Email -->
    <Purpose>SSLClientAuth</Purpose>

    <!-- Addtional Pass Phrase related (in auto mode) info section -->
    <appSalt>179!</appSalt>
    <hashVersion>0</hashVersion>

    <!-- Logging information s e c t i o n -->
    <!-- LogTpes: eventlog, syslog, file or stderr -->
    <!--  if type is file, LogLocation is read to get filename -->
    <LogType>eventlog</LogType>
    <LogLocation>c:\CertMan\logs\CertMan.log</LogLocation>

    <!-- Timer information s e c t i o n -->
    <!-- sleepTime is in hours, reqDelay is in minutes -->
    <sleepTime>24</sleepTime>
    <reqDelay>30</reqDelay>
    <daysB4Expiry>30</daysB4Expiry>

    <!-- DN ( Distinguished Name ) s e c t i o n -->
    <!--  countryName, stateOrProvinceName, localityName organizationName -->
    <!--  are informational They cannot be left blank - enter "na" at least -->
    <countryName>US</countryName>
    <stateOrProvinceName>CA</stateOrProvinceName>
    <localityName>San Francisco</localityName>
    <organizationName>Wellsfargo.com</organizationName>
    <!-- Specify a valid organizationalUnitName: group.application -->
    <!-- or alternatively complete the Requester-Approver info section below -->
    <!-- Please contact PKI team in order to obtain a valid OUN -->
    <organizationalUnitName>BCA.BST</organizationalUnitName>

    <!-- Requester-Approver information s e c t i o n -->
    <requesterFullName>na</requesterFullName>
    <requesterEmail>na</requesterEmail>
    <requesterPhone>na</requesterPhone>
    <!-- EmploymentType: FTE or Contractor -->
    <requesterEmploymentType>na</requesterEmploymentType>
    <!-- EmployeeID: Enter SSN if Contactor -->
    <requesterEmployeeNumber>na</requesterEmployeeNumber>
    <requesterAUCC>na</requesterAUCC>
    <approverFullName>na</approverFullName>
    <approverEmail>na</approverEmail>
    <approverPhone>na</approverPhone>
    <serverName>na</serverName>
    <Department>na</Department>
    <District>na</District>
    <Company>na</Company>
    <keyLength>na</keyLength>
    <Comments>na</Comments>

</CertManProperties>
```

Fig. 24

DISTRIBUTED CRYPTOGRAPHIC MANAGEMENT FOR COMPUTER SYSTEMS

CROSS REFERENCE TO RELATED APPLICATIONS

This Application claims priority to U.S. Provisional Application No. 60/667,186, entitled Distributed Cryptographic Key Management, filed 30 Mar. 2005, which application is incorporated herein in its entirety by this reference thereto.

FIELD OF THE INVENTION

The invention relates to the field of cryptographic systems between devices operating across a network. More particularly, the invention relates to distributed cryptographic management systems between one or more client machines and a centralized management system.

BACKGROUND OF THE INVENTION

Cryptographic keys that computer applications or devices use to authenticate to, encrypt data to, and/or decrypt data from other computers or applications have to be carefully managed to maintain secrecy, privacy and confidentiality. Computer systems vendors and computer application vendors provide methods to manage these cryptographic keys from a console manually. The management of many devices, securely, is a problem, and without automation tools and secure processes, the job is time-consuming, tedious, and prone to mistakes.

The certificate life-cycle includes request, issuance, installation, and renewal of public key and symmetric key based cryptographic solutions. Manual cryptographic key installation and renewal can be difficult and is expensive. The number of servers across many systems often large, e.g. some systems include well over 5,000 servers, and server management, with certificate management excepted, is highly automated.

In asymmetric public key infrastructure (PKI) based solutions, the expiration of the client keys regularly results in production service outages and customer confusion. As well, symmetric, i.e. private, key based systems suffer from cumbersome, time-consuming and risky key update processes.

Server administrators have to interact with applications, to request and properly setup application key stores to interact with other "relying" applications. This interface is typically manual, cumbersome, slow, and requires a certain level of training and to understanding for the administrator to properly request and configure the application. The result is limited use of a powerful technology, and excess cost in human interface activity. Additionally, administrators can inadvertently configure application key stores to trust what they should not. As well, without substantial training, the administrator does not know what to do to meet appropriate policies or guidelines.

Research has shown that such problems are recognized, yet most businesses continue to use the manual methods for cryptographic system management.

It would therefore be advantageous to provide a system and method to automate certificate life-cycle management for cryptographic keys. The development of such an automated cryptographic key system would constitute a major technological advance.

Several methods have been described for cryptographic key management.

S. Lee and P. Smith, Management of Cryptographic Keys, U.S. Pat. No. 4,912,762, disclose a "method for simplifying key management in situations where unique cryptographic keying relationships are required end-to-end between pairs of parties and a symmetric encryption algorithm is to be used. It is useful in cases where the parties come from disjoint subsets of the total population of parties. The method provides some of the characteristics of a public key crypto system (PKS) utilizing the public identities of the parties as part of the key, but lacks the property of PKS which allows a party to independently generate a secret key which is known only to that party."

J. Howard, P. Hess and J. MacStravic, Apparatus and Methods for Managing Key Material in Cryptographic Assets, U.S. Patent Application Publication No. US 2001/0026619 A1, disclose "Apparatus and methods for managing key material in cryptographic assets are disclosed. The methods can include defining first key material to be delivered to a cryptographic asset, wherein the first key material has a cryptoperiod having an expiration. Second key material to be delivered to the cryptographic asset is also defined. An automatic delivery of the second key material is scheduled such that the second key material will be delivered automatically to the cryptographic asset at or before the expiration of the cryptoperiod of the first key material. The methods can include defining a set of equipment classes, and registering at least one cryptographic asset with each equipment class. Cryptographic assets selected from the registered cryptographic assets are grouped into secure communication services, thereby defining secure communication interfaces between the cryptographic assets. Key material for each communications interface is defined, and an automatic delivery of the key material to the selected cryptographic assets is scheduled. The apparatus and methods of the invention provide an integrated key management system suitable for managing key material in a plurality of cryptographic assets from a single system."

T. Ninomiya and K. Matsunaga, Cryptographic Key Management Method, U.S. Patent Application Publication No. US 2002/0131601 A1, disclose "A network system has: an application server for providing service; a client for using the service; and a key server. The client acquires and stores a management cryptographic key, acquires a transaction cryptographic key to be used for a transaction with the application server, encrypts the transaction cryptographic key with the management cryptographic key, sends the encrypted transaction cryptographic key to the key server, requests the key server to send back the encrypted transaction cryptographic key for a transaction, and decrypts the encrypted transaction cryptographic key with the management cryptographic key to acquire the transaction cryptographic key. The key server stores the sent, encrypted transaction cryptographic key and sends the encrypted transaction cryptographic key to the client in response to a request from the client."

Other methods have also been described for cryptographic key and certificate management, such as: European Patent Application No. EP-0 287 720—Management of Cryptographic Keys; European Patent Application No. EP 1 241 826 A2—Cryptographic Key Management Method; WADAA, A et al., *Scalable Cryptographic Key Management in Wireless Sensor Networks*; Proceedings—24th International Conference on Distributed Computing System Workshops p. 796-802, IEEE Comput. Soc, Los Alamitos, Calif., USA, 2004; WILLIAM, P; Cisco System's Simply Certificate Enrollment Protocol—White Paper; IMCentric, Inc., *Automating Digital Certificate Management*; IMCentric Product Overview for AutoCert Manager, http://www.IMCentric.com; IMCentric, Inc., IMCentric Product Overview, IMCentric Product Overview, http//www.IMCentric.com; and Wong, C. K. et al.;

*Keystone: A Group Key Management Service*; HRL Laboratories, LLC, Malibu, Calif., USA.

Other systems provide various details of the operation of cryptographic systems, such as European Patent Application No. EP 1 274 243 A2, System for Securing Encryption Renewal System and for Registration and Remote Activation of Encryption Device; European Patent Application No. EP 863 021 20.0, Transaction System; J. Okimoto and L. Tang, System for Securing Encryption Renewal System and for Registration and Remote Activation of Encryption Device, U.S. Patent Application Publication No. US 2002/0051539 A1; E. Scheidt and C. Wack, System and Method of Providing Communication Security, U.S. Patent Application Publication No. US 2002/0062451 A1; N. So, J. Okimoto, A. Chen, L. Tang, A. Wakabayashi and K. Cochran, System for Securely Delivering Encrypted Content on Demand with Access Control, U.S. Patent Application Publication No. US 2002/0083438 A1; J. Howard Jr., P. Hess and J. MacStravic, Apparatus and Methods for Managing Key Material in Cryptographic Assets, U.S. Patent Application Publication No. US 2002/0126849 A1; C. Ogg and W. Chow, Secured Centralized Public Key Infrastructure, U.S. Patent Application Publication No. 2002/0178354 A1; T. Olkin and J. Moreh, Security Server System, U.S. Patent Application Publication No. US 2003/0074552 A1; P. Fahn and J. Semple, URL-Based Certificate in a PKI, U.S. Patent Application Publication No. US 2003/0074555 A1; M. Nadooshan and J. Ren, Method and Apparatus for Secure Key Management Using Multi-Threshold Secret Sharing, U.S. Patent Application Publication No. US 2003/0147535 A1; K. McCurley and B. Reed, Secure User-Level Tunnels on the Internet, U.S. Patent Application Publication No. US 2003/0167403 A1; R. Ziegler, System and Methods for Processing PIN-Authenticated Transactions, U.S. Patent Application Publication No. US 2004/0044739 A1; G. Kalogridis, G. Clemo and C. Yeun, Methods and Apparatus for Secure Data Communication Links, U.S. Patent Application Publication No. US 2004/0117623 A1; K. Ginter, V. Shear, F. Spahn, D. Van Wie and R. Weber, Trusted Infrastructure Support Systems, Methods and Techniques For Secure Electronic Commerce Transaction and Rights Management, U.S. Patent Application Publication No. US 2004/0123129 A1; S. Matyas, D. Abraham, D. Johnson, R. Karne, A. Le, R. Prymak, J. Thomas, J. Wilkins and P. Yeh, Data Cryptography Operations Using Control Vectors, U.S. Pat. No. 4,918,728; S. Matyas, D. Abraham, D. Johnson, R. Karne, A. Le, R. Prymak, J. Thomas, J. Wilkins and P. Yeh, Secure Management of Keys Using Control Vectors, U.S. Pat. No. 4,941,176; S. Matyas, D. Johnson, R. Karne, A. Le, W. Martin, R. Prymak and J. Wilkins, Secure Key Management Using Programmable Control Vector Checking, U.S. Pat. No. 5,007,089; S. Matyas, D. Abraham, D. Johnson, R. Karne, A. Le, P. McCormack, R. Prymak and J. Wilkins, Secure Management of Keys Using Control Vectors With Multi-Path Checking, U.S. Pat. No. 5,103,478; T. Nguyen, M. Subramanian and D. Haller, System, Method and Article of Manufacture for a Gateway System Architecture with System Architecture with System Administration Information Accessible From a Browser, U.S. Pat. No. 5,931,917; K. Rowney and Y. Chen, System, Method and Article of Manufacture For Secure Digital Certification of Electronic Commerce, U.S. Pat. No. 5,996,076; T. Moreau, Initial Secret Key Establishment Including Facilities for Verification of Identity, U.S. Pat. No. 6,061,791; T. Nguyen, D. Haller and G. Kramer, System, Method and Article of Manufacture For a Gateway Payment Architecture Utilizing a Multichannel, Extensible, Flexible Architecture, U.S. Pat. No. 6,072,870; R. Lewis, T. Dwyer, M. Abdelsadek, D. Han, J. Rogoff and L. Parks, Methods and Apparatus for Internet Based Financial Transactions With Evidence of Payment, U.S. Pat. No. 6,233,565 B1; S. Bisbee, L. Moskowitz, D. Trotter and M. White, System and Method for Electronic Transmission Storage and Retrieval of Authenticated Documents, U.S. Pat. No. 6,237,096 B1; G. Kramer and J. Weber, Settlement of Aggregated Electronic Transactions Over a Network, U.S. Pat. No. 6,324,525 B1; J. Howard Jr., P. Hess and J. MacStravic, Apparatus and Methods for Managing Key Material in Heterogeneous Cryptographic Assets, U.S. Pat. No. 6,442,690 B1; K. Ginter, V. Shear, F. Spahn, D. Van Wie and R. Weber, Trusted Infrastructure Support System, Methods and Techniques for Secure Electronic Commerce Transaction and Rights Management, U.S. Pat. No. 6,658,568 B1; International Publication No. WO 00/25473, Apparatus and Methods for Managing Key Material in Heterogeneous Cryptographic Assets; International Publication No. WO 00/45347, Methods for Operating Infrastructure and Applications for Cryptographically-Supported Services; International Publication No. WO 01/22322 A2, Electronic Commerce with Cryptographic Authentication; International Publication No. WO 01/22650 A2, Server-Side Implementation of a Cryptographic System; International Publication No. WO 01/22651 A2, Cryptographic Server with Provisions for Interoperability Between Cryptographic Systems; International Publication No. WO 02/39224 A2—Methods for Distributed Trust Environment; International Publication No. WO 03/034682 A1, URL-Based Certificate in a PKI; International Publication No. WO 98/52316, Initial Secret Key Establishment Including Facilities for Verification of Identity; International Publication No. WO 99/14979, Cryptographic System for Public ATM/SONET Communication System With Virtual Circuit Lookup and Pipelined Data Encryption and Decryption; Cungang Yang et al., *Cryptographic Key Management Solution in a Role Hierarchy*, Canadian Conference on Electrical and Computer Engineering 2004 (IEEE Cat. No. 04CH37513) vol. 1 p. 575-8, IEEE, Piscataway, N.J., USA, 2004; B. Lehane et al., *Shared RSA Key Generation in a Mobile Ad Hoc Network*, MILCOM 2003. 2003 IEEE Military Communications Conference (IEEE Cat. No. 03CH37500) vol. 2 p. 814-19, IEEE, Piscataway, N.J., USA, 2003; *Applied Cryptography and Network Security*; Second International Conference, ACNS 2004. Proceedings (Lecture Notes in Comput. Sci. vol. 3089), Springer-Verlag, Berlin, Germany, 2004; Y. Wang et al., *An Efficient Key Management for Large Dynamic Groups*, Proceedings. Second Annual Conference on Communication Networks and Services Research p. 131-6, IEEE Comput. Soc, Los Alamitos, Calif., USA, 2004; T. Berson, *Crytography Everywhere; Advances in Cryptology*, ASIACRYPT 2000, 6th International Conference on the Theory and Application of Cryptology and Information Security. Proceedings (Lecture Notes in Computer Science vol. 1976) p. 72, Springer-Verlag, Berlin, Germany, 2000; R. Oppliger, *Protecting Key Exchange and Management Protocols Against Resource Clogging Attacks*, Secure Information Networks. Communications and Multimedia Security, IFIP TC6/TC11 Joint Working Conference on Communications and Multimedia Security (CMS'99) p. 163-75, Kluwer Academic Publishers, Norwell, Mass., USA, 1999; E. Dawson et al., *Key Management in a Non-Trusted Distributed Environment*, Future Generation Computer Systems vol. 16, no. 4 p. 319-29, Elsevier, February 2000, Netherlands; D. Branstad et al., *Policy-Based Crytographic Key Management: Experience with the KRP Project*, Proceedings DARPA Information Survivability Conference and Exposition. DISCEX'00 vol. 1 p. 103-14, IEEE Comput. Soc, Las Alamitos, Calif., USA, 1999; A. Zugaj; *Cryptographic Key Management in IT Net-*

*works*, Przeglad Telekomunikacyjny+Wiadomosci Telekomunicayjne vol. 71, no. 10 p. 728-31, SIGMA NOT, 1998, Poland; *A New Approach to Cryptographic Facility Design*, ICL Technical Journal vol. 8, no. 3 p. 492-505, May 1993, UK; Wang Min, *A New Cryptographic Key Management Scheme*, Chinese Journal of Computers vol. 16, no. 2 p. 106-12; February 1993, China; R. Fullard, *Cryptographic Key Management*; INFOSEC '90, Information Security Symposium Proceedings p. 71-9, CSIR, Pretoria, South Africa, 1990, South Africa; P. Yeh et al., *ESA/*390 *Integrated Cryptographic Facility: An Overview*, IBM Systems Journal vol. 30, no. 2 p. 192-205, 1991, USA; S. Matyas et al., *A Key-Management Scheme Based on Control Vectors*, IBM Systems Journal vol. 30, no. 2 p. 175-91, 1991, USA; C. Patni, *Smart Technology for Corporate Banking*, Smart Card '91 International Exhibition p. 11 pp. vol. 2, Agestream Ltd, Peterborough, UK, 1991; D. Gerberick, *Cryptographic Key Management or Strong Network Security Management*, SIGSAC Review vol. 8, no. 2 p. 12-23, Summer 1990, USA; D. Newman Jr. et al., *Public Key Management For Network Security*, IEEE Network vol. 1, no. 2 p. 11-16, April 1987, USA; R. Lennon et al., *Cryptographic PIN Processing in EFT Systems*, COMPCON 79 Proceedings, Using Microprocessors, Extending Our Reach p. 142-7, IEEE, New York, N.Y., USA, 1979; W. Ehrsam, et al., *A Cryptographic Key Management Scheme For Implementing The Data Encryption Standard*, IBM Systems Journal vol. 17, no. 2 p. 106-25, 1978, USA; A. Perrig et al., *ELK, a New Protocol for Efficient Large-Group Key Distribution*; University of California Berkeley; R. Poovendran, *On the Communication-Storage Minimization for a Class of Secure Multicast Protocols*, IEEE Infocom 2001, Dept. of Electrical and Computer Engineering, Univ. of Maryland, USA; G. Eddon et al., *Understanding the DCOM Wire Protocol by Analyzing Network Data Packets*, http://www.msdn.com/MSJ/March 1998.

It would be advantageous to provide a cryptographic management system that does not require manual intervention to establish, modify, and/or renew security architectures for client machines, such as servers or computers. The development of such a cryptographic management system would constitute a major technological advance.

As well, it would be advantageous to provide a cryptographic management system that provides structures and methodologies for automated establishment, modification, and/or renewal of security architectures for client machines, such as servers or computers. The development of such a cryptographic management system would constitute a major technological advance.

Furthermore, it would be advantageous to provide a cryptographic management system that provides structures and methodologies whereby a system administrator can automatically establish, modify, and/or renew security architectures for client machines, such as servers or computers, whereby a system administrator can automatically. The development of such a cryptographic management system would constitute a further major technological advance.

In addition, it would be advantageous to provide a cryptographic management system that provides structures and methodologies whereby an approving entity can authorize the establishment, modification, and/or renewal of security architectures for one or more client machines. The development of such a cryptographic management system would constitute an additional technological advance.

SUMMARY OF THE INVENTION

A computer application is registered to receive a key from a key management system, where the application is associated with a previously approved manager or approver. A systems administrator installs a key management agent on the server that shows that an XML-based key management registration file contains all the appropriate cryptographic keys for the server. The approver is able to pre-approve the key request for the server if desired. The key management service is started on the server, which posts requests for keys to the configured centralized key management server. The central key management service logs the requests posted to it by the new or any renewing clients, and checks for pre-approval records already existing for the server. If none are found, email messages are sent to the approver for the requesting server. When the key request is verified as approved, the request is flagged for further processing in the key management database. The supported key generation systems (a certificate of authority is one example) continuously poll the database looking for records flagged for processing, use the request to generate keys and other appropriate elements for the requesting server, and post the keys and other elements to the key management database. The server key management agent polls the key management service periodically until finding the expected key file, which it downloads and installs into the protected file location on the server. The key management agent periodically sends a status message relating to its keys to the central key management service, which tracks expected behavior of the server/key management agent.

BRIEF DESCRIPTION OF THE DRAWINGS

FIG. 20 is a table of certificate status codes;

FIG. 21 is a table of certificate request codes;

FIG. 23 shows a first portion of exemplary CertMan template coding;

FIG. 24 shows a first portion of exemplary CertMan template coding;

DETAILED DESCRIPTION OF PREFERRED EMBODIMENTS

Figure 1:
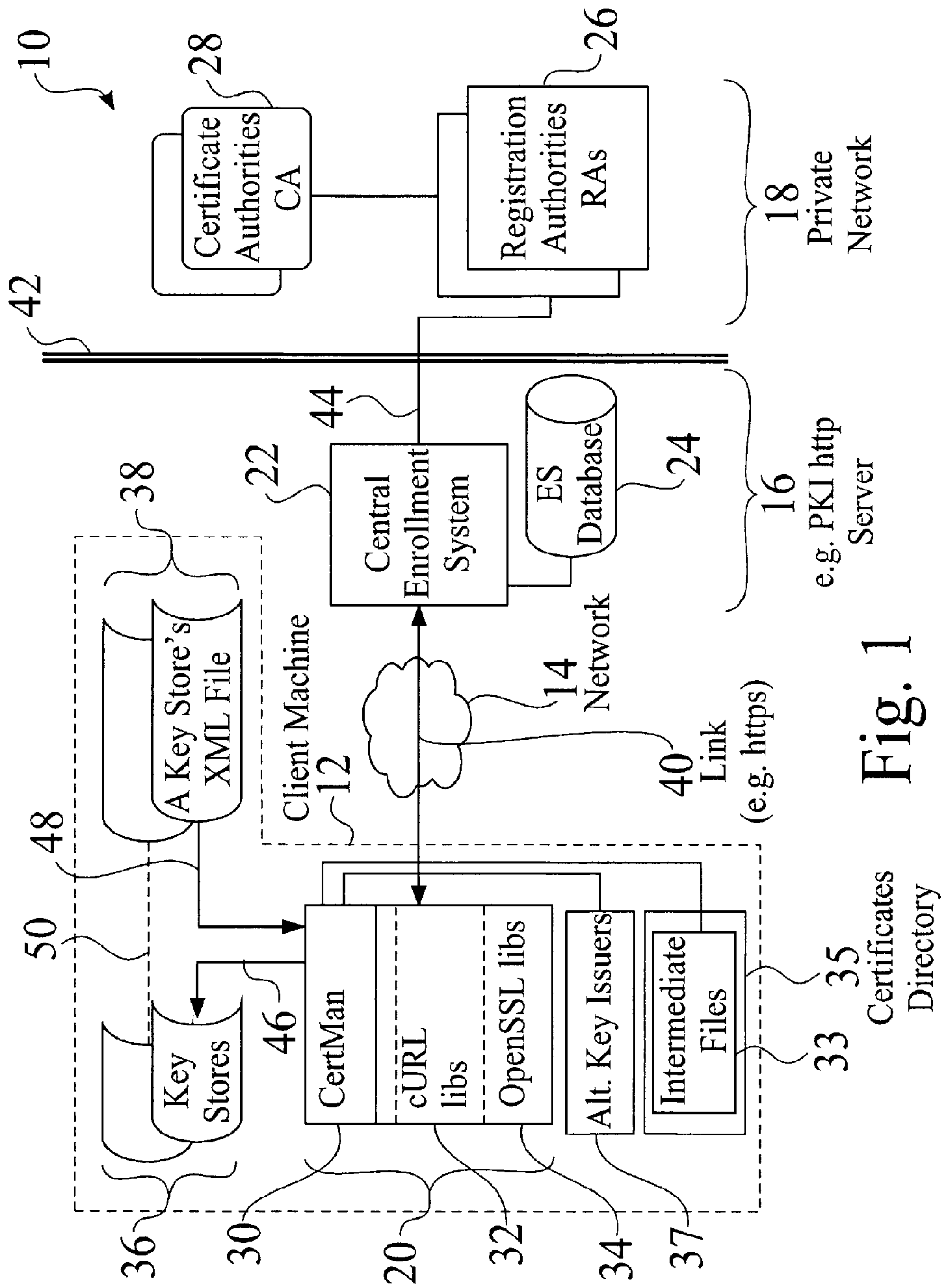
FIG. 1 is a schematic view of a certificate management distributed cryptographic management system.
Figure 2:
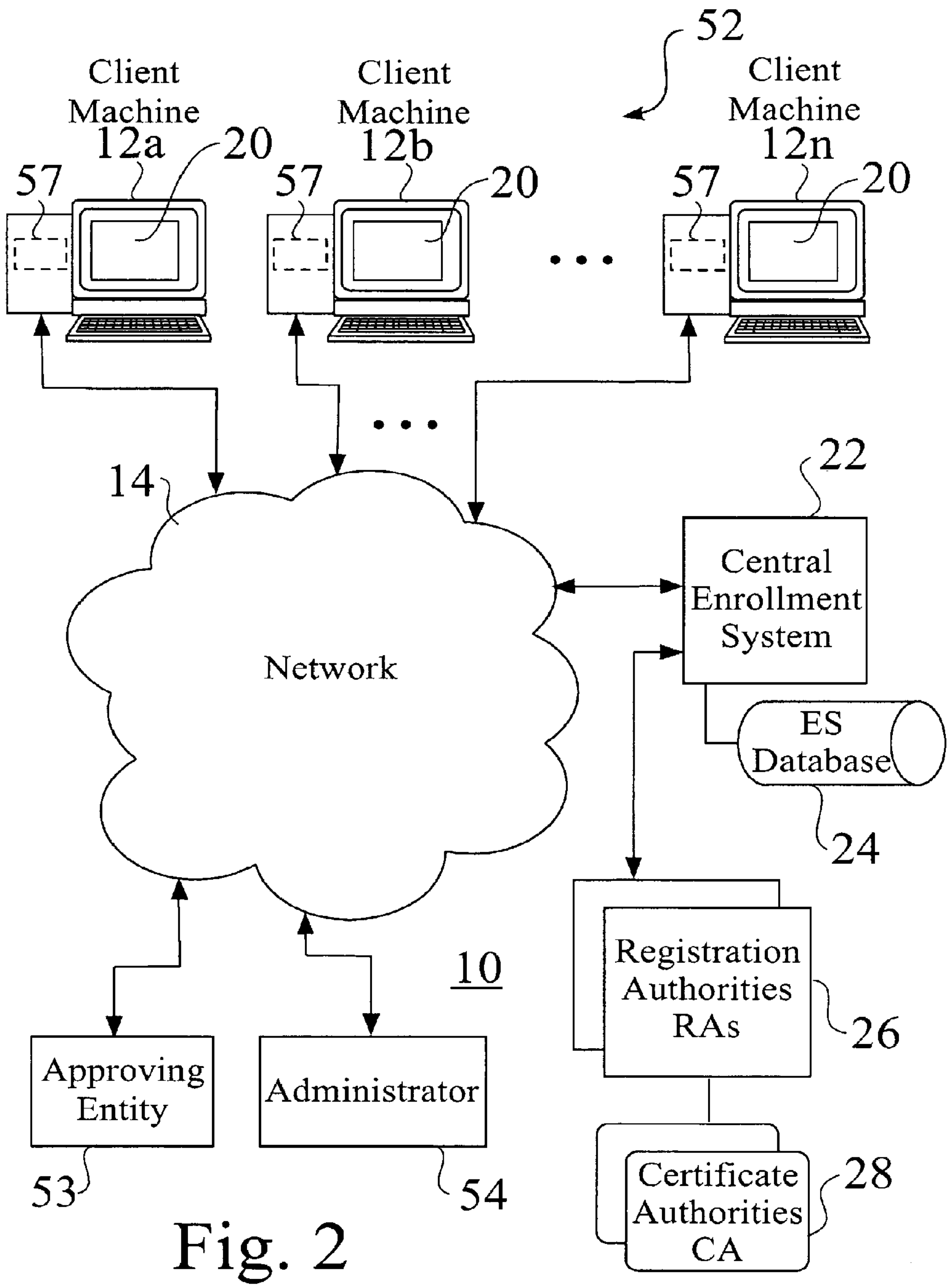
FIG. 2 is a schematic view of a certificate management distributed cryptographic management system serving a plurality of client machines.
Figure 3:
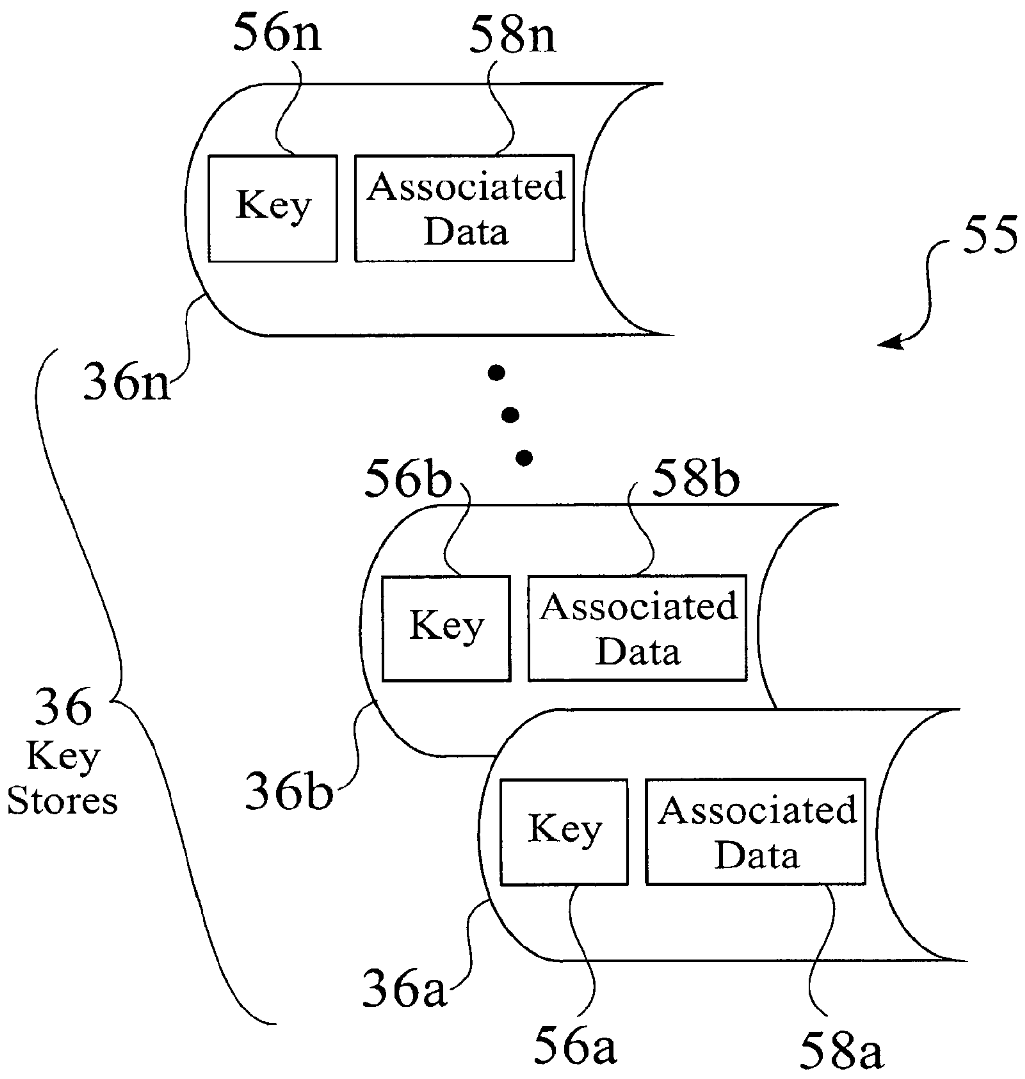
FIG. 3 is a detailed schematic view of keystore elements.

FIG. 1 is a schematic view of a distributed cryptographic key management system 10. FIG. 2 is a schematic view 52 of a distributed cryptographic key management system 10 serving a plurality of client machines 12. FIG. 3 is a detailed schematic view 55 of keystore elements 36, e.g. 36*a*-36*n*, such as comprising keys 56 and associated data 58, e.g. 56*a* and 58*a* (FIG. 3).

As seen in FIG. 1, a central enrollment system 22, such as but not limited to a public key infrastructure (PKI) enrollment system 22, is typically located at a server 16, e.g. a PKI http server 16. An enrollment system database 24 is associated with the enrollment system 22, and may also be located at server 16.

The central enrollment system 22 is associated with one or more registration authorities (RA) 26 and certificate authorities (CA) 28. A certificate authority 28 typically issues and verifies keystore elements 36 and/or digital certificates 180 (FIG. 6) for the system 10, while a registration authority 26 provides verification services for a certificate authority 28. Registration authorities 26 and certificate authorities 28 are linked 44 to the enrollment system 22, and in some embodiments are located within a private network 18, such as but not limited to a sealed network 18. The secure barrier, i.e. a firewall, 42 may also be included for the link 44 between the enrollment system 22 and one or more registration authorities 26 and one or more certificate authorities 28.

The enrollment system 22 provides services to one or more authorized client machines 12, e.g. computers or servers 12, through associated connections 40, e.g. https links, across a network 14. In the distributed cryptographic management system 10, a distributed key management agent or application 20 is provided for a client machine 12, such as comprising a certificate manager module 30, and associated files, such as but not limited to cURL libraries 32 and OpenSSL libraries 34. Keystores 36 and associated key store XML files 38 are also established in coordination with the key management agent 20.

Figure 4:
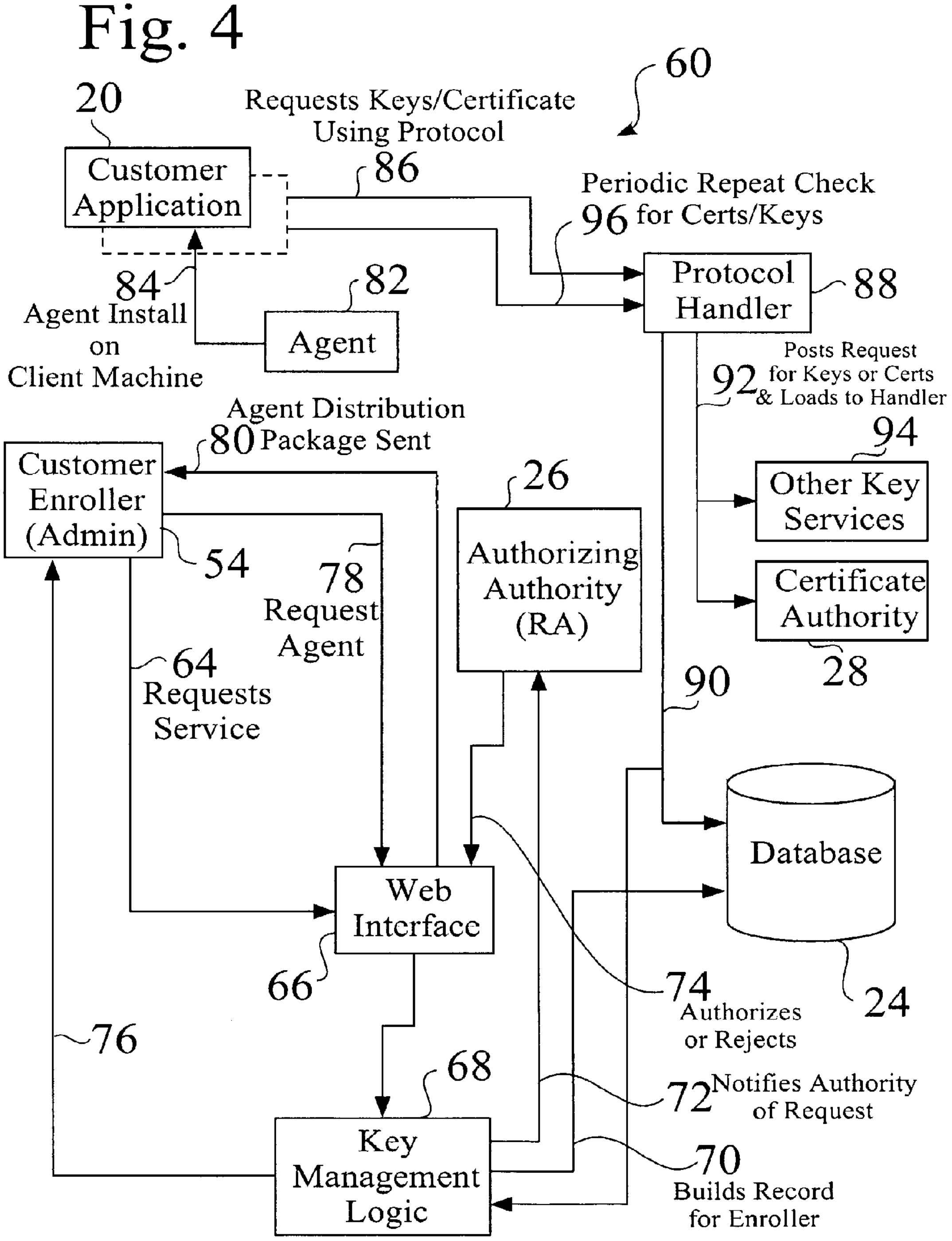
FIG. 4 is a schematic view of initial setup for a certificate management distributed cryptographic management system.

FIG. 4 is a schematic view of an initial setup 60 for a distributed cryptographic management system 10. An administrator customer enroller 54 requests 64 service, such as by filling out a form and by providing authentication material through a web interface 66, to key management logic 68. Based on a request 64, the key management logic 68 builds 70 a record for the enroller 54, such as within the system database 24.

The key management logic 68 also notifies 72 the registration authority 26, e.g. an internal authorizing authority 26, of the request 64, whereby the registration authority 26 returns a decision 74, to authorize or reject the request 64, wherein an approval 74 can be automated.

Upon a decision 74 to authorize the request 64, the key management logic 68 notifies 76 the customer enroller 54 to install an appropriate key management installation agent 82 at the client machine 12. The customer enroller 54 then requests 78 the authorized installation agent 82, such as through the web interface 66, whereby an agent distribution package is sent 80 to the customer enroller 54, which typically comprises XML and configuration software, and whereby the installation agent 82 is installed 84 on the appropriate client machine 12, from which a key management agent 20 is installed, formed, accessed or otherwise provided.

The key management agent application 20 can then request 86 keystore elements 36, such as keys or certificates 56 and associated data 58, from a protocol handler 88, using the system protocol. The protocol handler 88 checks 90 the status and/or proceeds with the request 86 with the key management logic 68 and/or database 24. The protocol handler 88 can also post 92 the request if appropriate with the certificate authority 28 and/or other key services 94.

The key management agent 20 can repeat the request for keystore elements 36, keys or certificates 56, and associated data 58 from the protocol handler 88, typically in a periodic manner, e.g. every few minutes.

Figure 5:
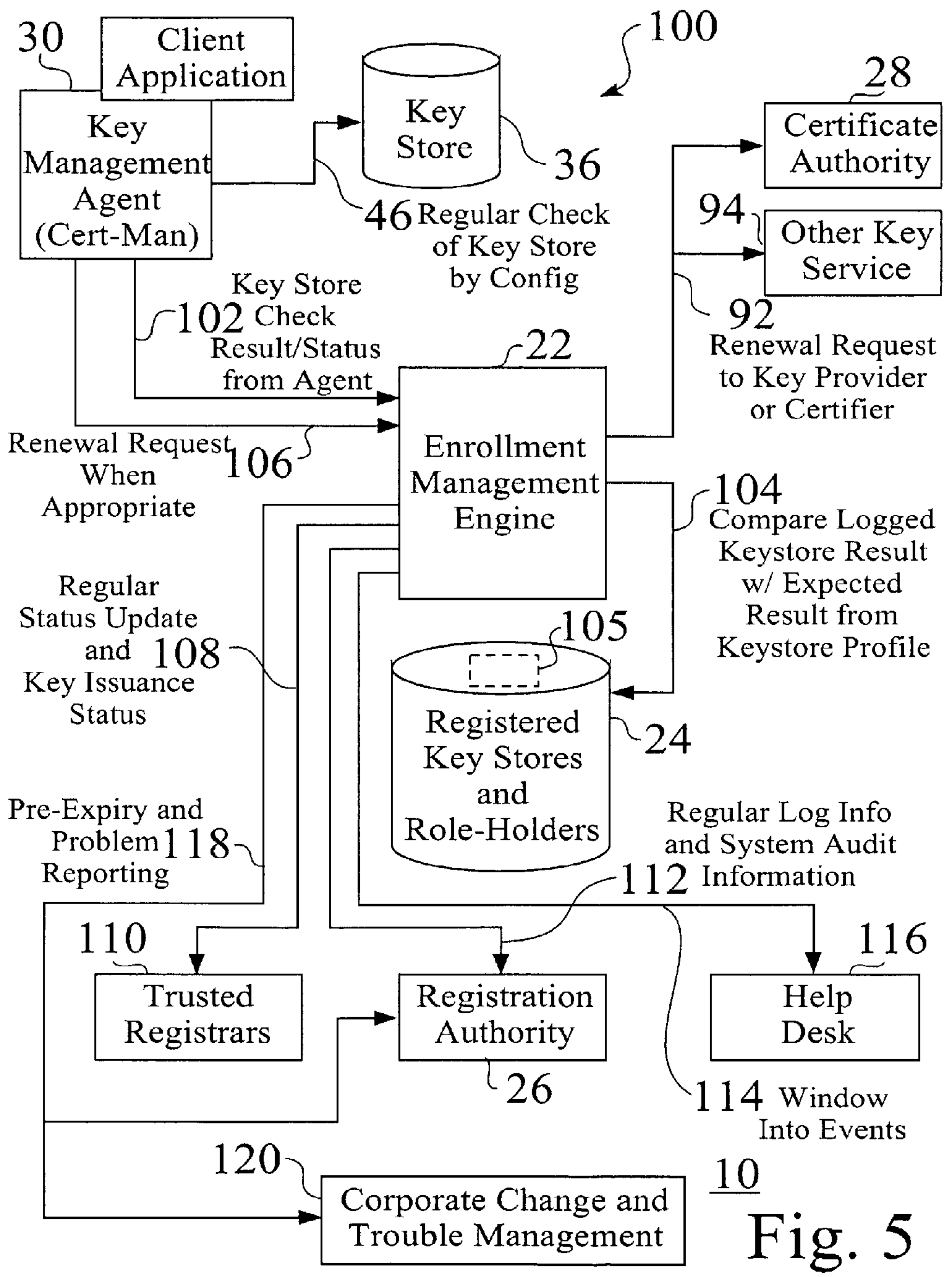
FIG. 5 is a detailed schematic view of a certificate management distributed cryptographic management system.

FIG. 5 is a detailed functional schematic view 100 of a distributed certificate management system 10. A key management agent 20, i.e. a certificate manager 20 at the client computer 12 performs a regular configuration check of the keystore 36. The result or status of the check 46 is sent from key management agent 20 to the enrollment management engine 22. The enrollment management engine 22 then compares 104 the logged result 46 with an expected result from a registered keystore profile 105, such as stored in the database 24. The key management agent 20 may also renew 106 a request from the enrollment management engine 22 when appropriate, whereby the enrollment management engine 22 forwards 92 a processed appropriate renewal request 106 to the certificate authority 28 and/or other key provider services 94 as necessary.

The enrollment management engine 22 provides 108 the status of regular updates and/or key issuance to a trusted registrars module 110. Regular log information and system audit information is also sent 112 to the registration authority 26. The enrollment management engine 22 may also provide a window 114 into events to a help desk module 116. The enrollment management engine 22 also typically provides 118 pre-expiration information and problem reporting to the registration authority 26 and if preferred, to a corporate change and trouble management module 120.

Figure 6:
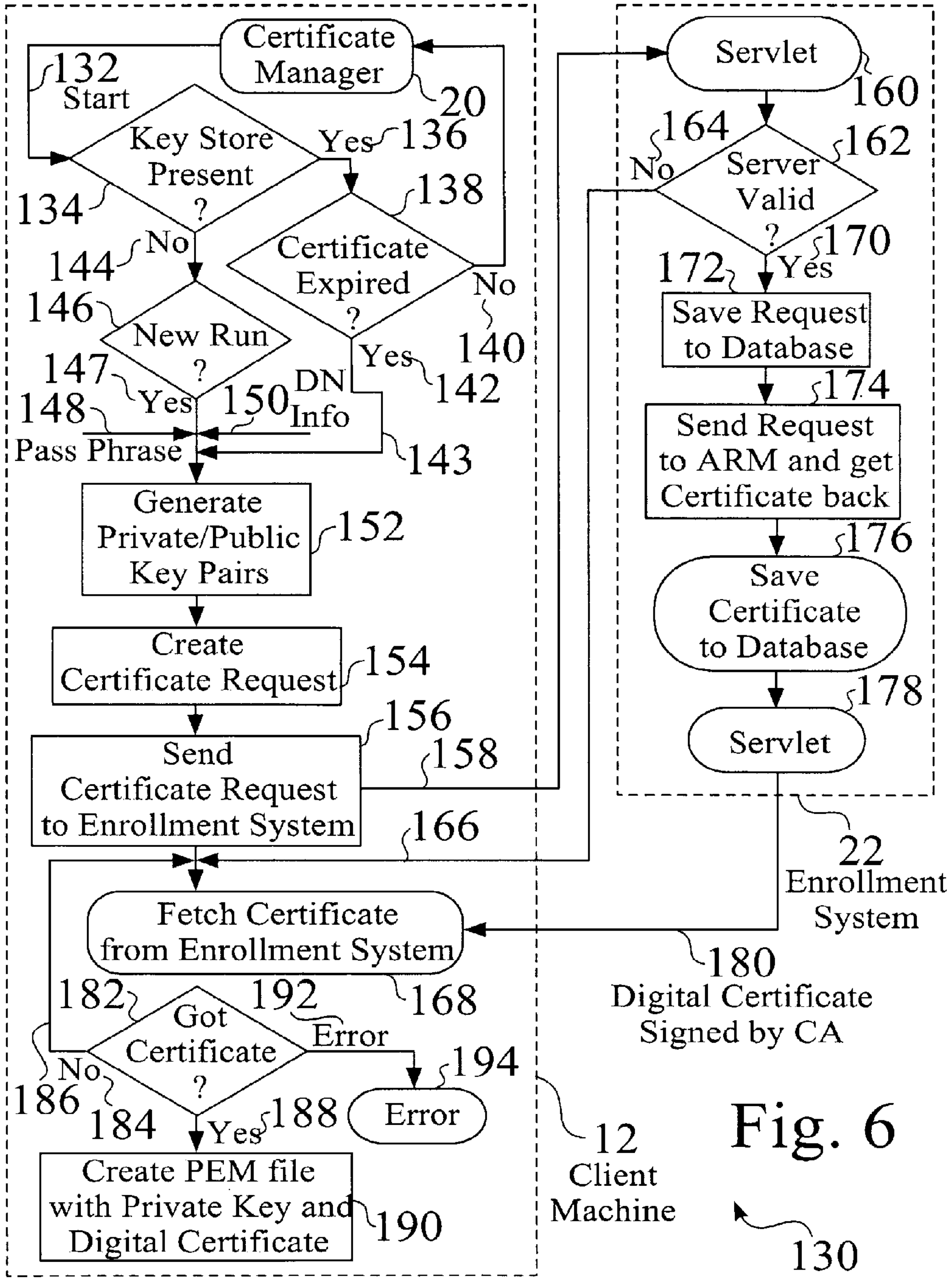
FIG. 6 is an automated functional certificate management process flow diagram for keystore maintenance between a client machine and an enrollment system.

FIG. 6 is a functional cryptographic manager process flow diagram 130 for keystore maintenance between a client machine 12 and an enrollment management system 22. At step 130, a key management agent 20 checks to see if a desired key store 36 (FIG. 1) is present 134.

If the keystore element 36 is present 136, a determination 138 is made whether the associated keystore element 36 is expired. If the keystore element 36 is not 140 expired, the key management agent 20 is updated. If the keystore element 36 is expired 142, the result 143 is provided to an update certificate request 154, and can include new key generation 146.

If the keystore element 36 is not present 144, a determination 146 is made whether a new run 146 is required. If yes 147, the system provides 152 private/public key pairs, typically inputting pass phrase information 148 and DN information 150, which typically are specified by the XML configuration file 38 (FIG. 1).

Based upon either a new request 146 or a renewal request 143, a keystore element request is created 154, such as in compliance with PKCS10 or other NIST approved random key generation standards. The keystore request 158, e.g. a certificate request 158, is then sent 156 to the enrollment system 22, for processing 160, such as by a server side coding servlet 160.

At the enrollment system 22, a determination is made whether the client machine 12 is valid 162. If not 164, an error message 166 is returned to the client machine 12. If the client machine 12, e.g. server 12, is valid 170, the enrollment system 22 saves 172 the processed request 158 to the database 24, and acquires 174 the associated keystore element 36, typically by the certificate authority 28 or other key service 94, such as by retrieving the request from the database 24, and by sending the associated keystore element 36 in response to the approved processed request 158. For example, in some system embodiments 22, the certificate authority 28 retrieves requests from the database 24, and posts the associated certificates 36 back to the database 24.

The associated keystore element 36 is then saved 176 to the enroller database 26, and the keystore element certificate 180, typically signed by the certificate authority 28, is then available on the enrollment server 22 to the key management agent application 20 at the client machine, i.e. computer or server 12. The key management agent 20 receives or fetches 168 digital certificates 180 from the enrollment system 22. In embodiments wherein the key management agent 20 periodically or continually checks for incoming or expected digital certificates 180, a determination is made whether a certificate is received 182. If not received 184, the process returns 186 to attempt to fetch or receive again. If the certificate 180 is received 188, an appropriate PEM file 36 is created, comprising a private key 56 and the digital certificate 180. If certificate receipt cannot be determined 192, the key management agent 20 provides appropriate error logic, logging and messaging.

Overview of System Functions and Features.

A distributed key management agent 20 at a client machine 12 is registered to receive a key 37 from the key management system 10, such as through an enrollment server 22. The distributed key management agent 20 is associated with a previously approved entity 53 (FIG. 2), such as a manager or approver 53.

A systems administrator 54 (FIG. 2) installs the "key management agent" 82 on the client machine 12, and insures that the key management registration file 38, e.g. such as an XML-based file 38 (FIG. 1) contains all appropriate cryptographic key definitions 37 for the client machine 12. The "approver" 53 is able to "pre-approve" the key requests 86,158 for the client machine 12 if desired.

The key management agent 20 is a certified secure agent that appropriately develops cryptographic keys, communicates with the key management service 22, protects the cryptographic keys on the systems it runs on, and communicates its status to the central key management system based on information security standards.

The distributed certificate management application 20, which provides key management, is started on the client machine 12, and posts requests 158 for digital certificates 180 having associated keys 36 to the configured centralized key management service 22.

The central key management service 22 logs 172 the requests 158 posted to it by the new (or any renewing) clients 12, and checks 162 for pre-approval records 170 already existing for the client machine 12. If none 64, a message 166, e.g. an email, voicemail or automated message 166, is sent to the approving entity 53 for the requesting server 12.

When the key request 158 is verified as approved 170, the request 158 is flagged 174, 176 for further processing in the key management database 24. The supported key generation systems (a certificate authority 28 is one example) continuously poll the database 24 looking for records flagged for processing, use the requests 158 to generate keys and other appropriate elements for the requesting client machine 12, and post 176 the keys 56, e.g. key 56*a* (FIG. 3) and other elements 58, e.g. associated data 58*a* (FIG. 3), to the key management database 24.

The client machine key management agent 20 polls the key management service 22 periodically until finding the expected key file 180, which it downloads and installs into the protected file location on the client machine 12.

The key management agent 2 periodically sends a status message relating to its keys 36,56,58 to the central key management service 22, which tracks expected behavior of the client machine and key management agent 20.

Exemplary Installation of Certificate Manager Software.

Figure 7:
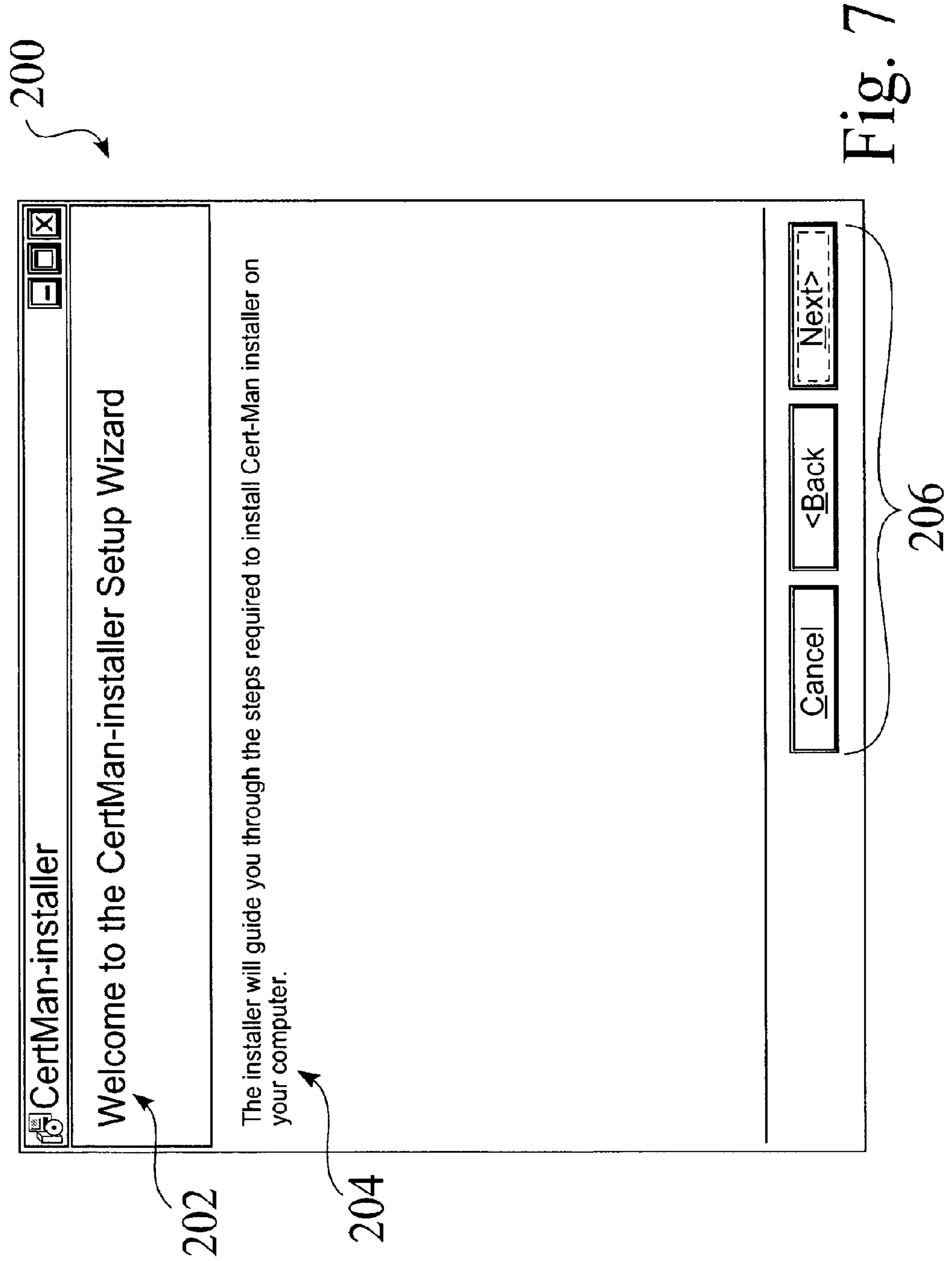
FIG. 7 is an installation welcome dialog screen for a distributed key management agent application.

FIG. 7 is an installation welcome dialog screen 200 for an installer agent 82 (FIG. 4) associated with a distributed key management agent 20 on an exemplary Windows™ Operating system, e.g. WIN32™, typically comprising welcome text 202, instructions 204, and graphic user interface (GUI) navigation/control 206.

Figure 8:
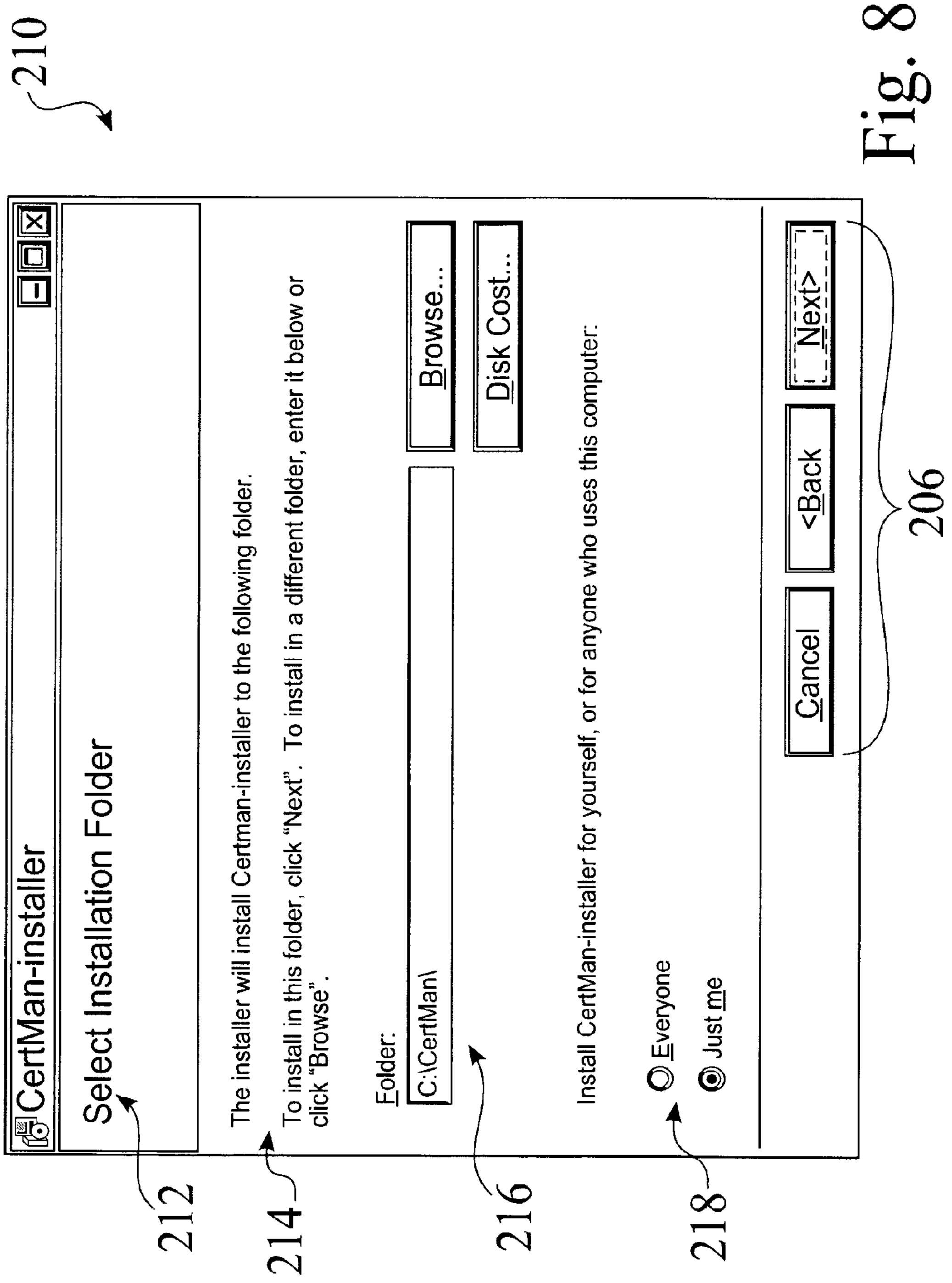
FIG. 8 is a select installation folder screen for a distributed key management agent.

FIG. 8 is a select installation folder screen 210 for an installer agent 82 (FIG. 4) associated with a distributed key management agent 20, typically comprising installation folder selection text 212, installation folder designation instructions 214, folder selection entry and navigation 216, installation option control 218, (e.g. to provide certificate management for only the primary user of the client computer 12 upon which the application is installed, or to extend the certificate management services other users of the client computer 12), and installation agent navigation/control 206.

Figure 9:
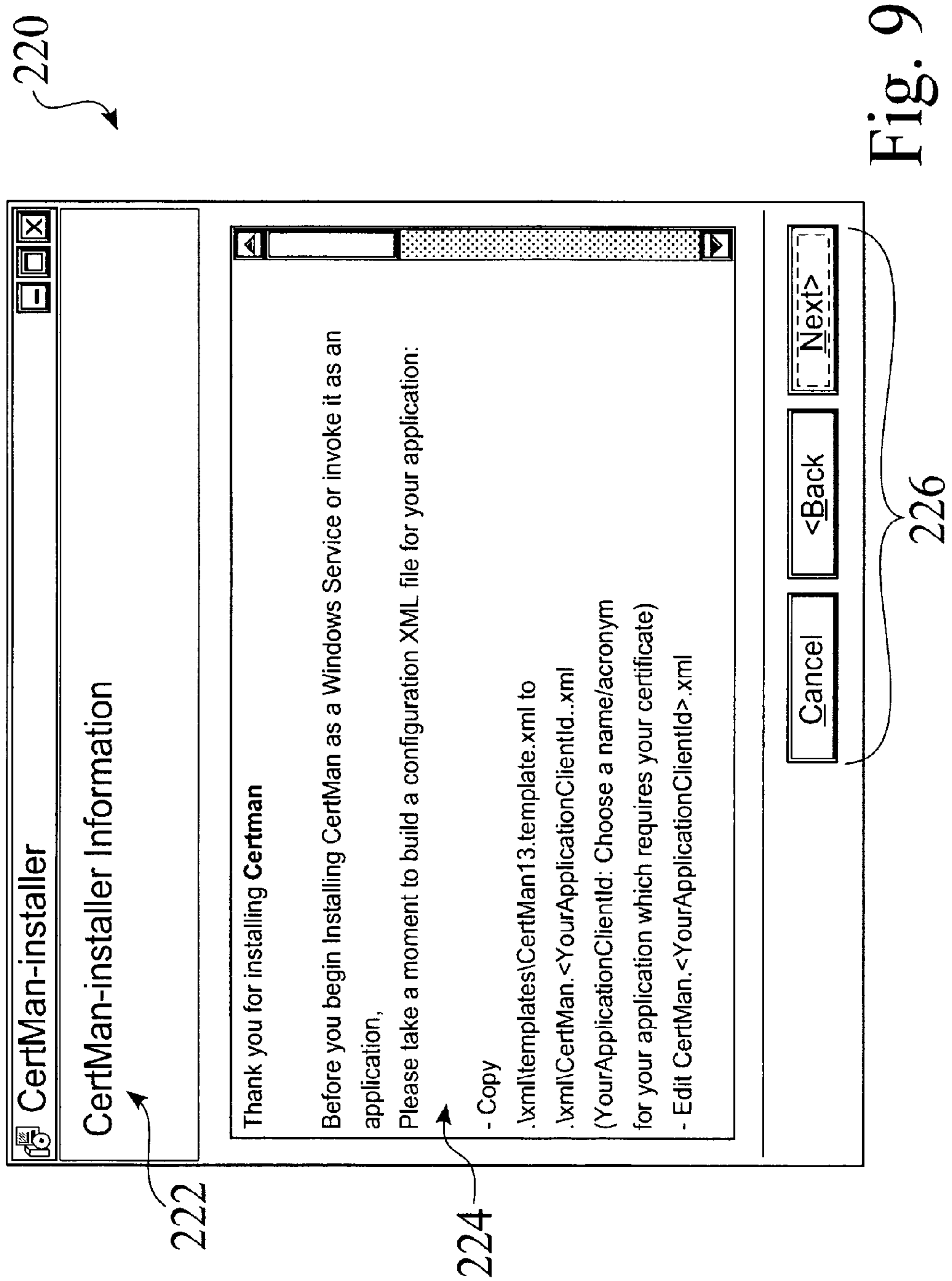
FIG. 9 is a post-installation screen and instructions for a distributed key management agent.

FIG. 9 is a post-installation screen 220 and instructions for an installer agent 82 associated with a distributed certificate manager application 20, typically comprising post installation headline text 222, detailed application description and instructions 224 for user-installation, enrollment and/or registration procedures, as well as post-installation navigation 226. As seen in FIG. 9, the exemplary displayed information 224 provides instructions 224 to build an appropriate configuration XML file 38 (FIG. 1) in a key management agent 20 installed on an exemplary client machine 12 running on a Windows™ operating system 57 (FIG. 2). Similar configuration files 38 are typically built, e.g. such as automatically or by the user, for key management agent applications 20 installed on other client machines 12, such as running on a wide variety of operating systems 57.

Exemplary Architecture for Certificate Manager Software.

Figure 10:
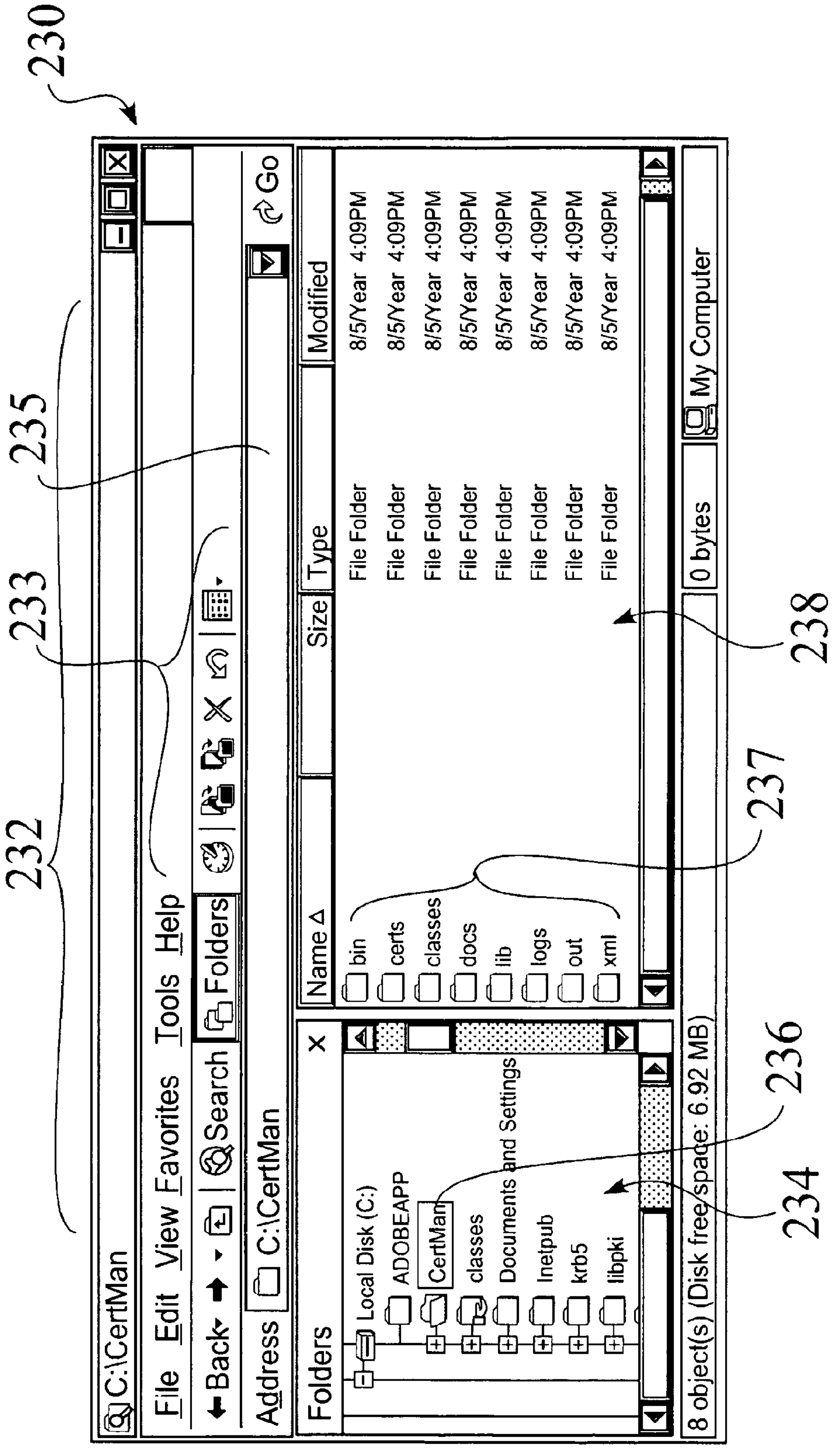
FIG. 10 shows a directory structure for a distributed key management agent application after installation.

FIG. 10 shows an exemplary directory structure 230 for a key management agent 20 after installation on a client computer 12. A directory interface 232 typically includes graphic user interface menus 233 and entry 235, as well as a directory tree display 234 and a directory detail display 238. As seen in FIG. 10, an exemplary key management agent, i.e. CertMan 20, as highlighted in the directory tree display 234, comprises a plurality of associated files and functional modules 237, such as bin files 246 (FIG. 11), certificate files, classes, documents, library files, logs, out files, and xml files.

Figure 11:
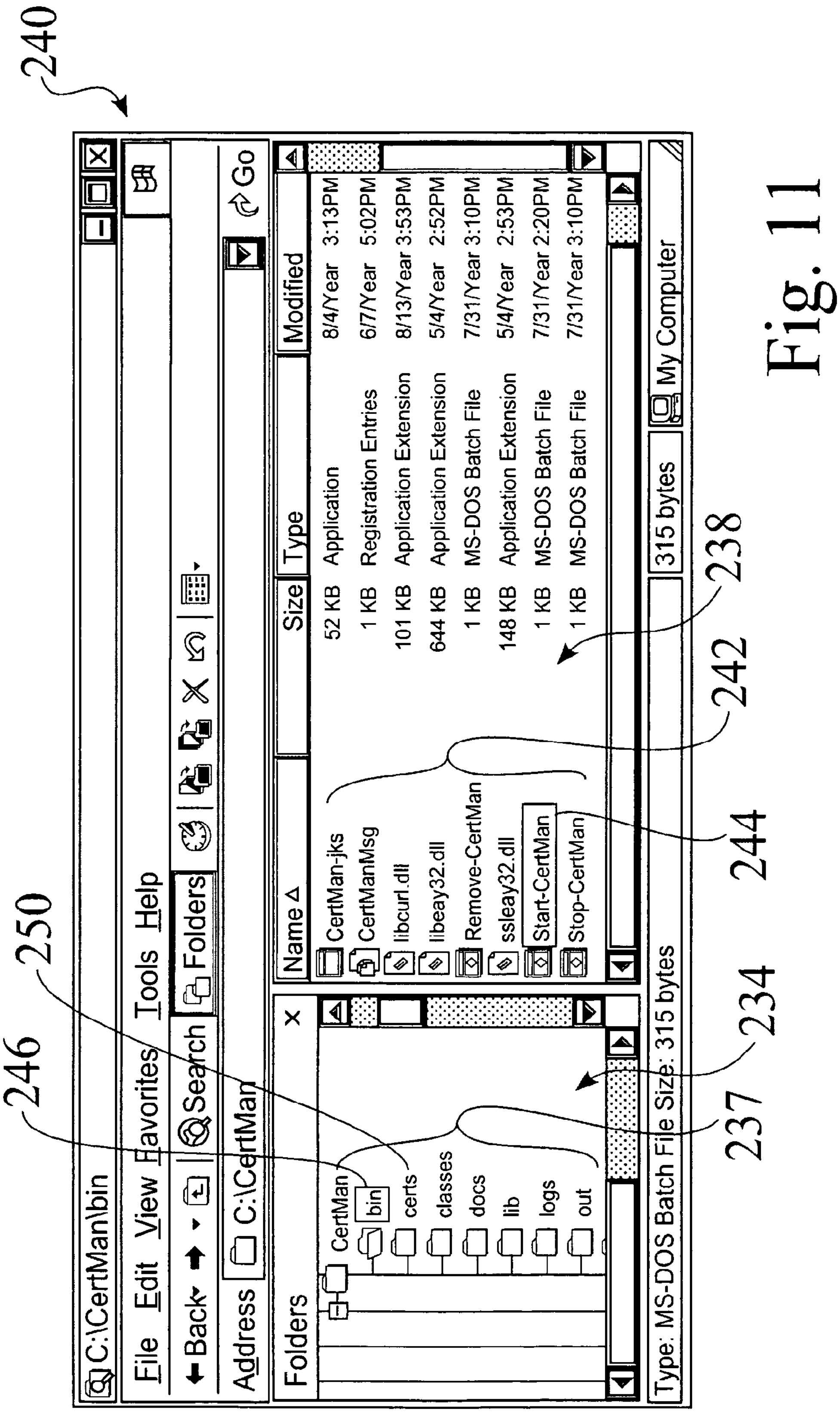
FIG. 11 shows a startup selection of a distributed key management agent.

FIG. 11 is a schematic diagram 240 showing startup selection 244 of a key management agent 20 after installation on a client computer 12. As seen in FIG. 11, the associated files for an exemplary key management agent 20 are provided in the directory tree display 234, while files 242 associated with the bin files 246 are indicated in the directory detail display 238. While the exemplary startup selection 244 shown in FIG. 11 is selection of a batch file 244 in a directory tree structure, a wide variety of implementation may be used as appropriate for the client computer 12 and operating system.

Exemplary Certificate Agent Repair and Removal.

Figure 12:
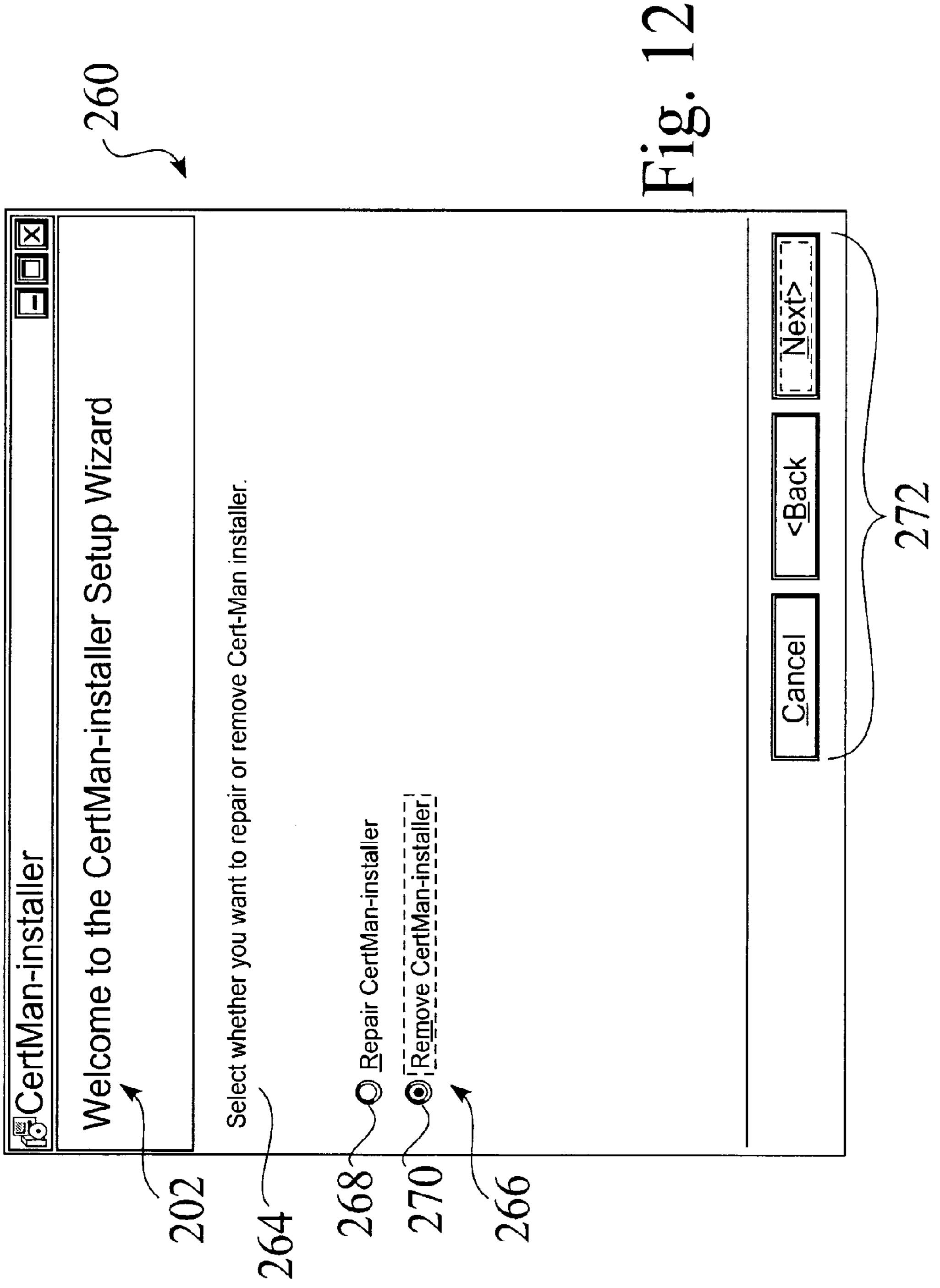
FIG. 12 shows an application repair/removal screen for a distributed key management agent.
Figure 13:
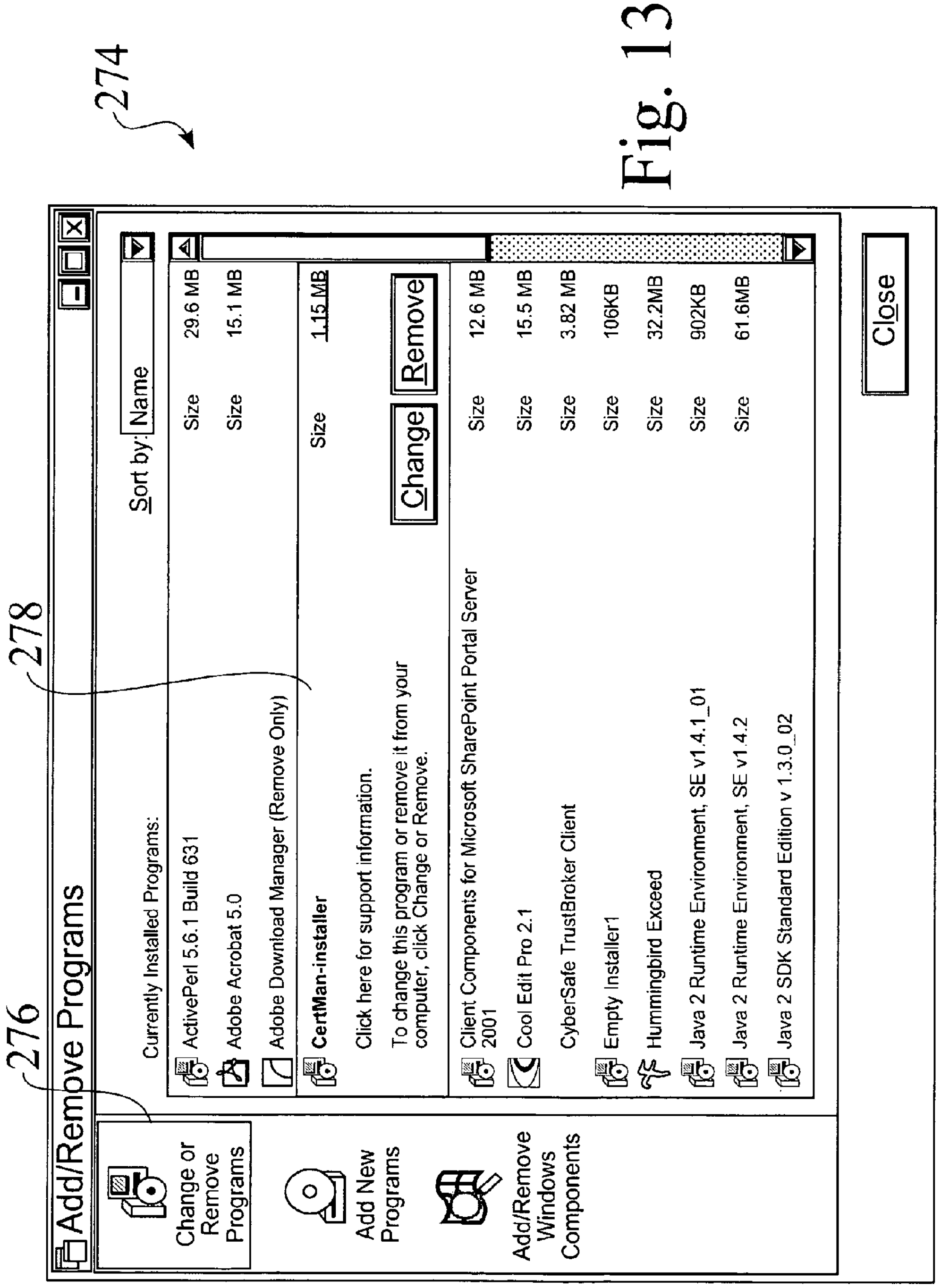
FIG. 13 shows change/removal navigation for a distributed key management agent.

FIG. 12 shows an application repair/removal screen 260 provided by a certificate management installer agent 82 (FIG. 4) associated with a distributed certificate manager application 20, typically comprising welcome text 202, instructions 264, option controls 268, such as to repair 268 or remove the installer agent 83, and navigation control 272. FIG. 13 shows control panel 274 having change/removal navigation 276,278 for a certificate management installer agent 82.

Exemplary Certificate Manager Application Details and Features.

Figure 14:
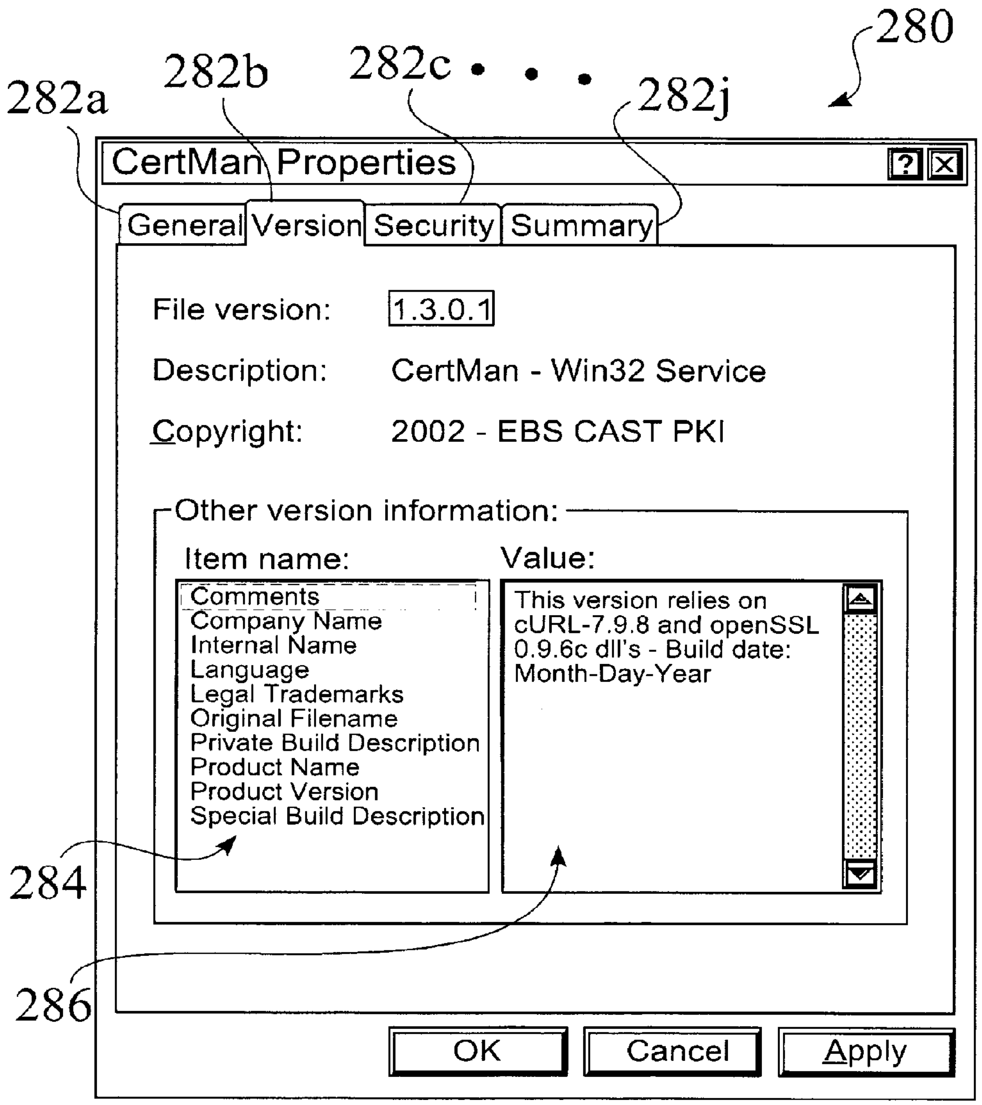
FIG. 14 shows a version properties window for distributed key management agent application.

FIG. 14 shows a version properties window 280 for distributed certificate manager application 20, to provide version properties 282 such as comprising general details 282*a*, version details 282*b*, security details 282*c*, and summary details 282*j*. The property window 280 shown in FIG. 14 provides an item name selection 284, and an associated property value display 286.

Figure 15:
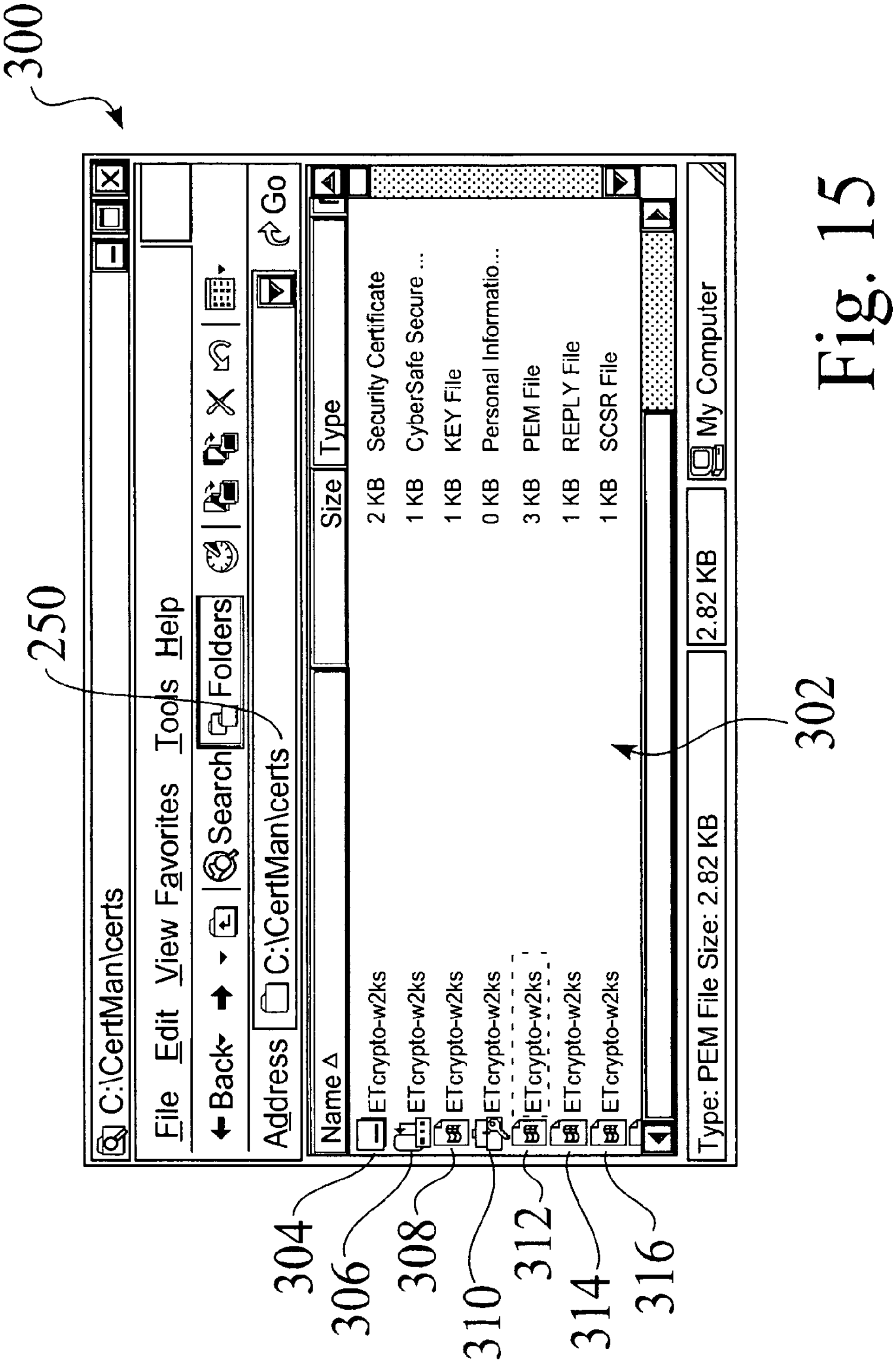
FIG. 15 shows a directory view of Certificates and Keystores for a distributed key management agent.

FIG. 15 shows a directory view 300 of certificates and keystores for a distributed certificate manager application 20. The key management agent 20 typically writes all certificate related files in a certificate directory 250, as shown in the directory display 302. The exemplary certificate directory 250 shown in FIG. 15 comprises a security certificate 304, a CyberSafe secure file 306, a KEY file 308, a personal information file 310, a PEM file 312, a REPLY file 314, and a SCSR file 316. As seen in FIG. 15, "crypto-w2ks" is the host name of the client machine 12. In FIG. 13, the name of the keystore 36 file 308 is "ETcrypto-w2ks.PEM".

Figure 16:
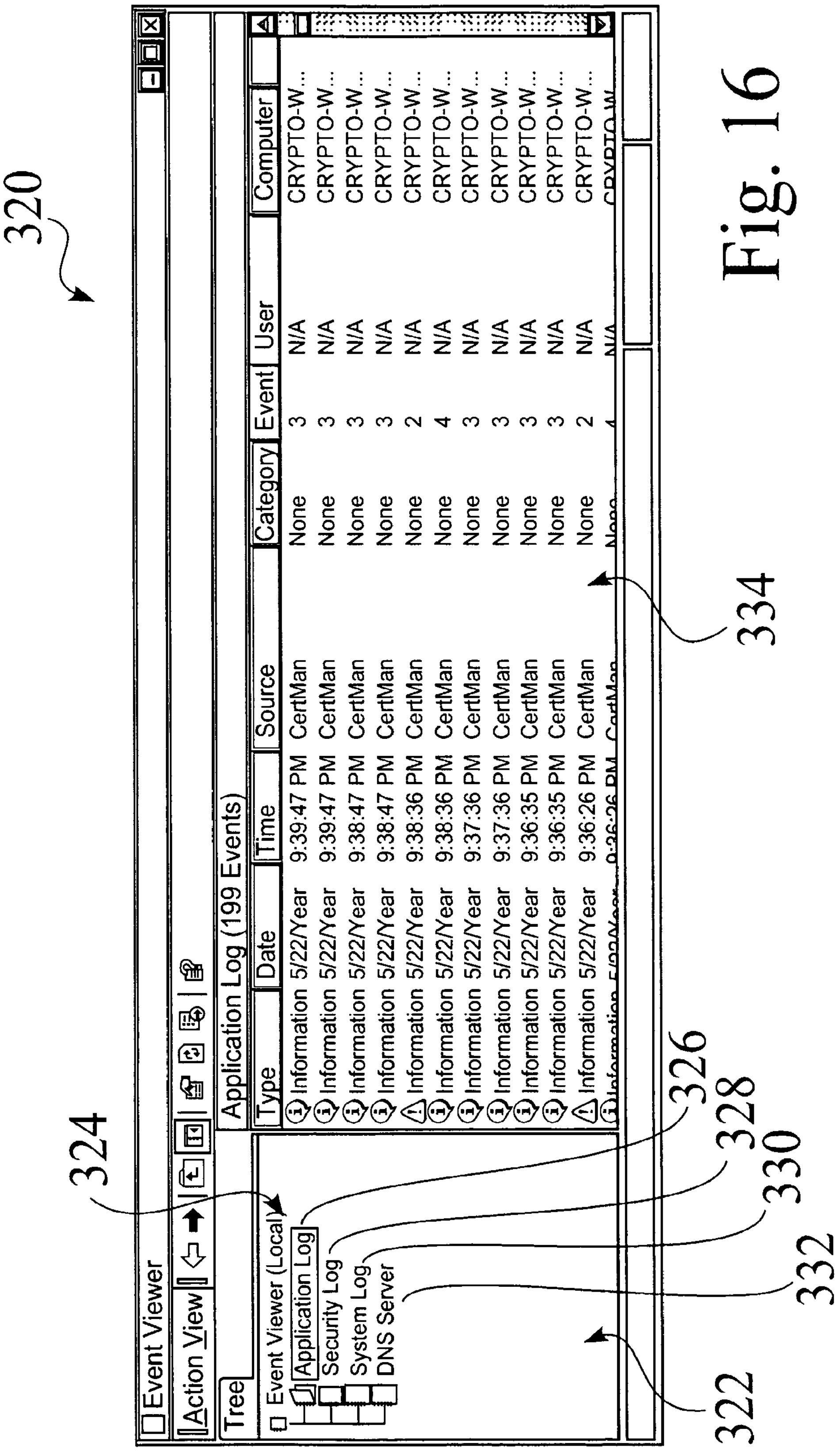
FIG. 16 shows an Administration Log view for a distributed key management agent application.
Figure 17:
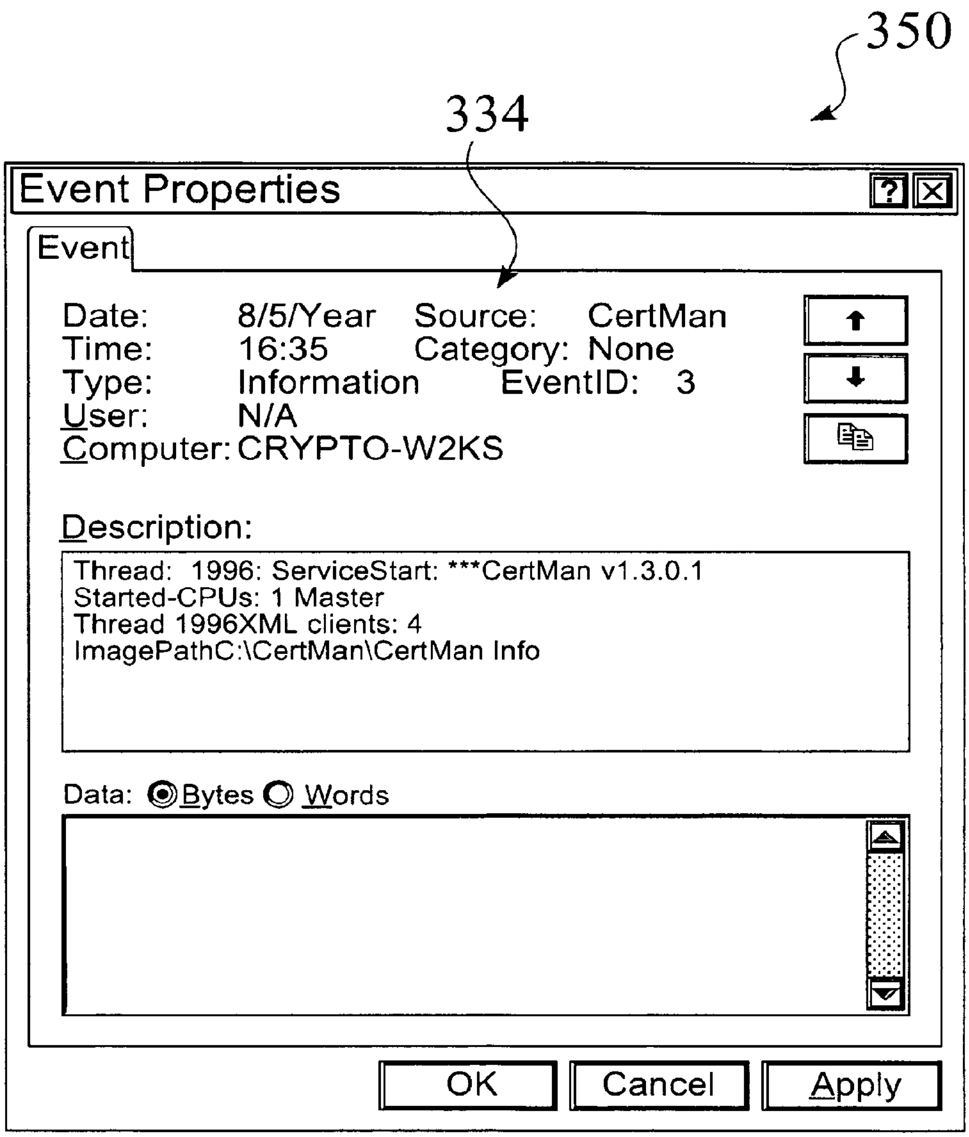
FIG. 17 shows an event detail window for an administration log.

FIG. 16 shows an Administration Log Screen 320 for a distributed certificate management application 20. An event viewer 324 within a distributed key management agent 20 typically provides information files for local events, as displayed in tree display 324 in FIG. 16, such as application log files 326, security log files 328, system log files 330, and DNS server files 332. Message files 334, such as for event information or warnings, are located in the highlighted Application log 326, as seen in FIG. 16. FIG. 17 shows an exemplary event detail window 350 for a particular message file 334 in the Application log file 326. An event detail window 350 is typically chosen by highlighting or clicking on a desired message file 334 within the user interface 350.

Key Store and Intermediate Files.

The distributed key management agent 20 builds a key store 36 (FIG. 1, FIG. 2, FIG. 3) for each phase marked as active in the configuration file 38, e.g. a configuration XML file 38 (FIG. 1). The format of the key store 36, such as but not limited to PEM or p12, is also specified in the configuration file 38.

The distributed key management agent 20 also creates a set of phase based intermediate files 33 (FIG. 1) in the certificate manager certificates directory 35 (FIG. 1), such as the exemplary certificate directory 250 shown in FIG. 15. The key management agent 20 can restore its previous state using intermediate files 33 (FIG. 1), such as after the agent 20 has been stopped and restarted. Users USR and administrators 54 do not need to alter the intermediate files 33.

In an exemplary distributed key management agent 20 implemented on a Unix operating system, having PEM format key stores 36, the intermediate files 33 typically comprise:

| | |
|---|---|
| <phase>host.reply | (Indicates the last reply from Enrollment System 22); |
| <phase>host.csr | (Certificate Signed Request); |
| <phase>host.scsr | (Saved Certificate Signed Request); |
| <phase>host.key | (Private Key); |
| <phase>host.status | (Certificate/Request last status); |
| <phase>host.cer | (Certificate for the Phase); and |
| <phase>host.PEM | (Key Store 36). |

The keystore 36 is used by the key management agent 20 during secure client authentication, e.g. secure socket layer (SSL) authentication. As described above, alternate embodiments of the distributed key management agent 20 provide alternate formats for key stores 36, such as but not limited to p12.

Certificate Manager Application Messages.

At runtime, a distributed key management agent 20 typically displays three level types of messages, such as to a log file 324, to event logs, and/or to system logs 330 (FIG. 16), i.e. Syslogs, based upon the operating system platform and on user log type specification. The levels of messages comprise debug messages (typically disabled from distribution release applications 20), informational messages, notice messages (typically UNIX specific), warning messages, and error messages.

Informational Messages.

There are several instances of informational messages, e.g. 10 instances. An exemplary format for some embodiments of an informational message is:

```
Date:time:<Internal CertMan function name>:[phase name}:
[New/Renew] <Message body>:[Last error | errno ]
```

In a user log file 324 (FIG. 16), an exemplary informational message is:

```
Tue Jun 18 11:25:02 2002: crypto_checkExp:ET: Certificate will
NOT expire in [30] days
```

In a system log file 330, operating on an exemplary Solaris 2.8 platform, an exemplary informational message is:

```
Jun 19 10:51:40 barkie CertMan[13322]: [ID 759548
daemon.info] cert_ksFileCheck:ET: KeyStore Not Found:
/opt/CertMan/certs/ETbarkie.PEM : No such file or directory
```

Figure 18:
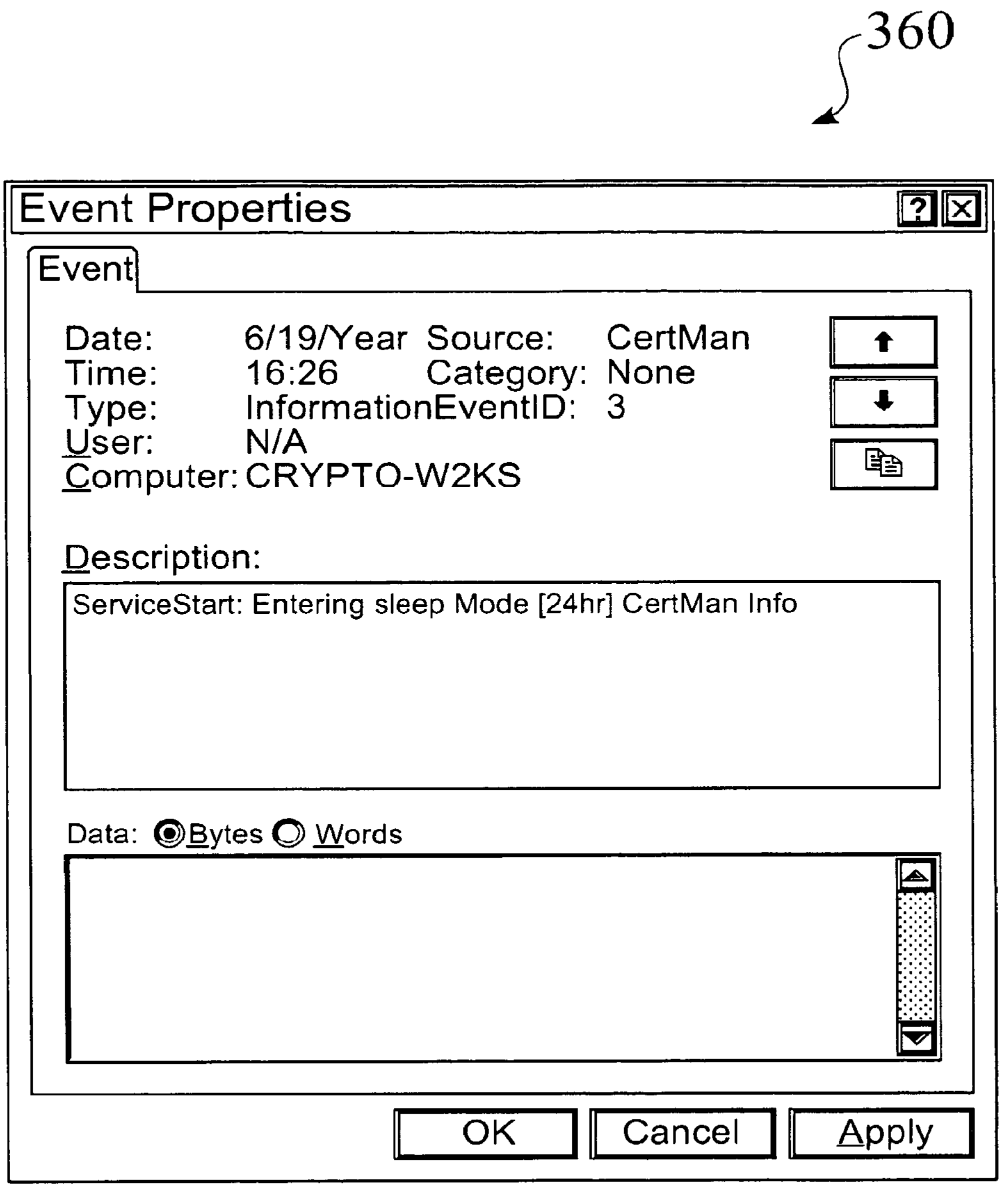
FIG. 18 shows an Information-type event log view in a distributed key management agent application.

FIG. 18 shows an Information-type Event Log View 360 in a distributed certificate management application 20.

Warning Messages.

There is typically a single instance for warning messages, e.g. an exemplary format for a warning message is:

```
Date:time:<Internal CertMan function name>:[phase name}:
Certificate will expire in [<#d>] days
```

In a user log file 324, an exemplary warning message is:

```
Tue Jun 18 11:25:02 2002: crypto_checkExp:ET: Certificate will NOT
expire in [30] days
```

In a system log file 330, operating on a Solaris 2.8 platform, an exemplary informational message is:

```
Jun 20 10:53:20 barkie CertMan[28809]: [ID 938438
daemon.warning] crypto_checkExp:ET: Certificate will expire in
[90] days
```

Figure 19:
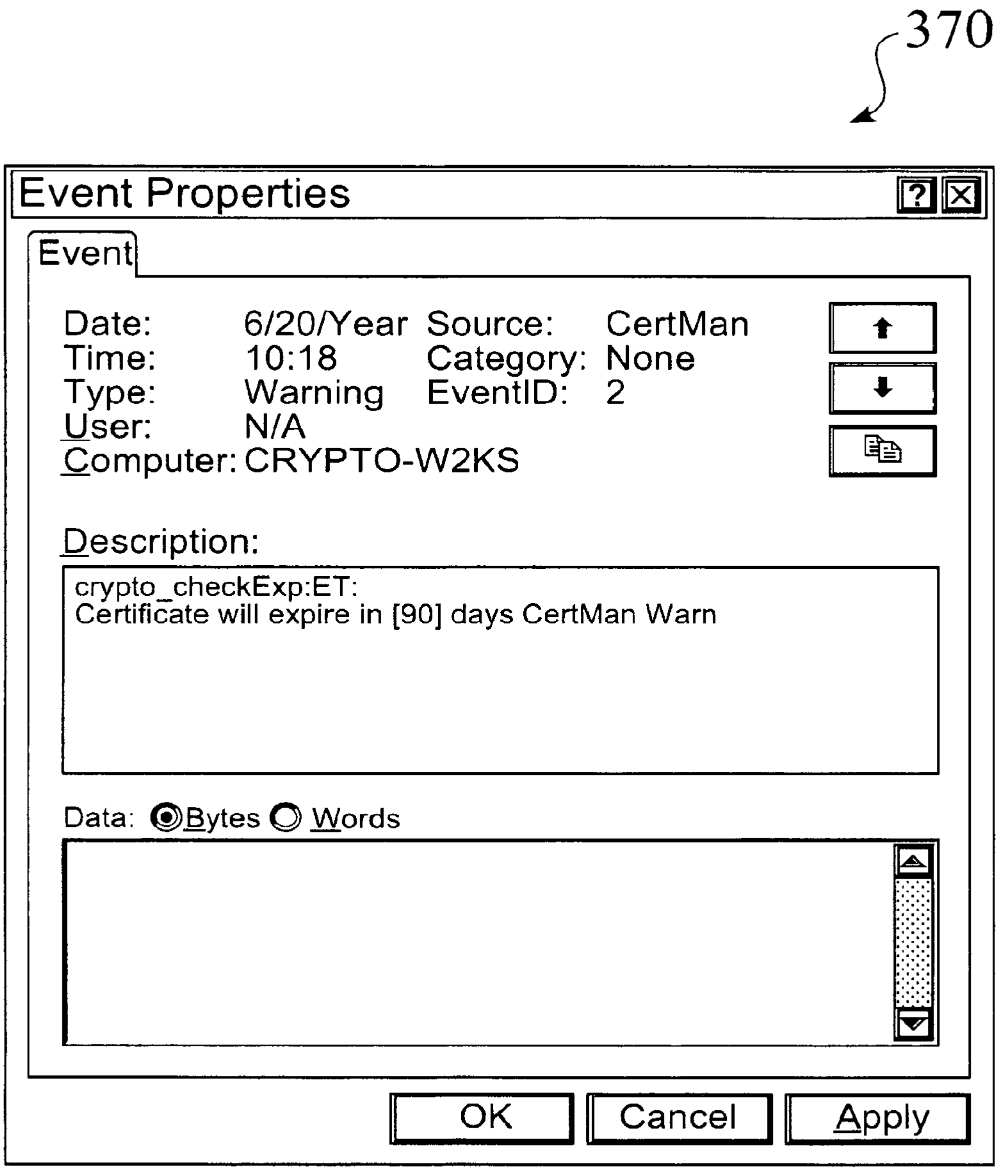
FIG. 19 shows a Warning-type event log view in a distributed key management agent application.

FIG. 19 shows a Warning-type Event Log View 370 in a distributed certificate management application 20.

Error Messages.

There are typically numerous instances of error type messages, e.g. 85 instances. An exemplary format for some embodiments of an informational message is:

```
Date:time:<Internal CertMan function name>:[phase name}:
ERROR [New/Renew] <Message body>:[Last error | errno ]
```

In most cases the message body is descriptive of the error. For example, in a certain situation, the key management agent 20 writes the following message:

Date:time::<Internal CertMan function name>:ET: ERROR: Status: # Request:#

An example of the message above is:

Wed May 22 15:39:01 2002::ProcessCert:ET: ERROR: Status:2 Request:1

Status & Status Codes.

In the distributed certificate management application 20, status codes pertain to the status of a certificate in the phase that is indicated in a message. FIG. 20 is a table 380 of certificate status ID codes 382, e.g. 382*a*-382*t*. In the distributed certificate management application 20, request codes pertain to a request for a certificate in the phase that is indicated in a message. FIG. 21 is a table of certificate request ID codes 390.

Run Time Phase Status.

In each stage of run time, the key management agent 20 maintains status IDs and request IDs for each phase in an alternate key issuer 37 (FIG. 1), to provide phase-status information, such as in the format <phase>host.status, wherein the contents may be seen as:

Contents: certificate status ID :request ID

For example content of 0:0 in a phase status file means: Certificate will not expire for the period indicated in XML and request nothing from the enrollment system server 22, e.g. the PKI 22.

Error Event Properties.

In a user log file 324, an exemplary error message is:

```
Thu Jun 20 11:08:16 2002: cert_getTranid:ET: ERROR tranid: NOT
Found, reply: Error INVALIDGROUP
```

In a system log file 330, operating on a Solaris 2.8 platform, an exemplary informational message is:

```
Jun 19 10:51:40 barkie CertMan[13322]: [ID 757220
daemon.error] cert_saveStatus:ET: ERROR : opening : / opt/CertMan/
certs/ETbarkie.status : Permission denied: Permission denied
```

Figure 22:
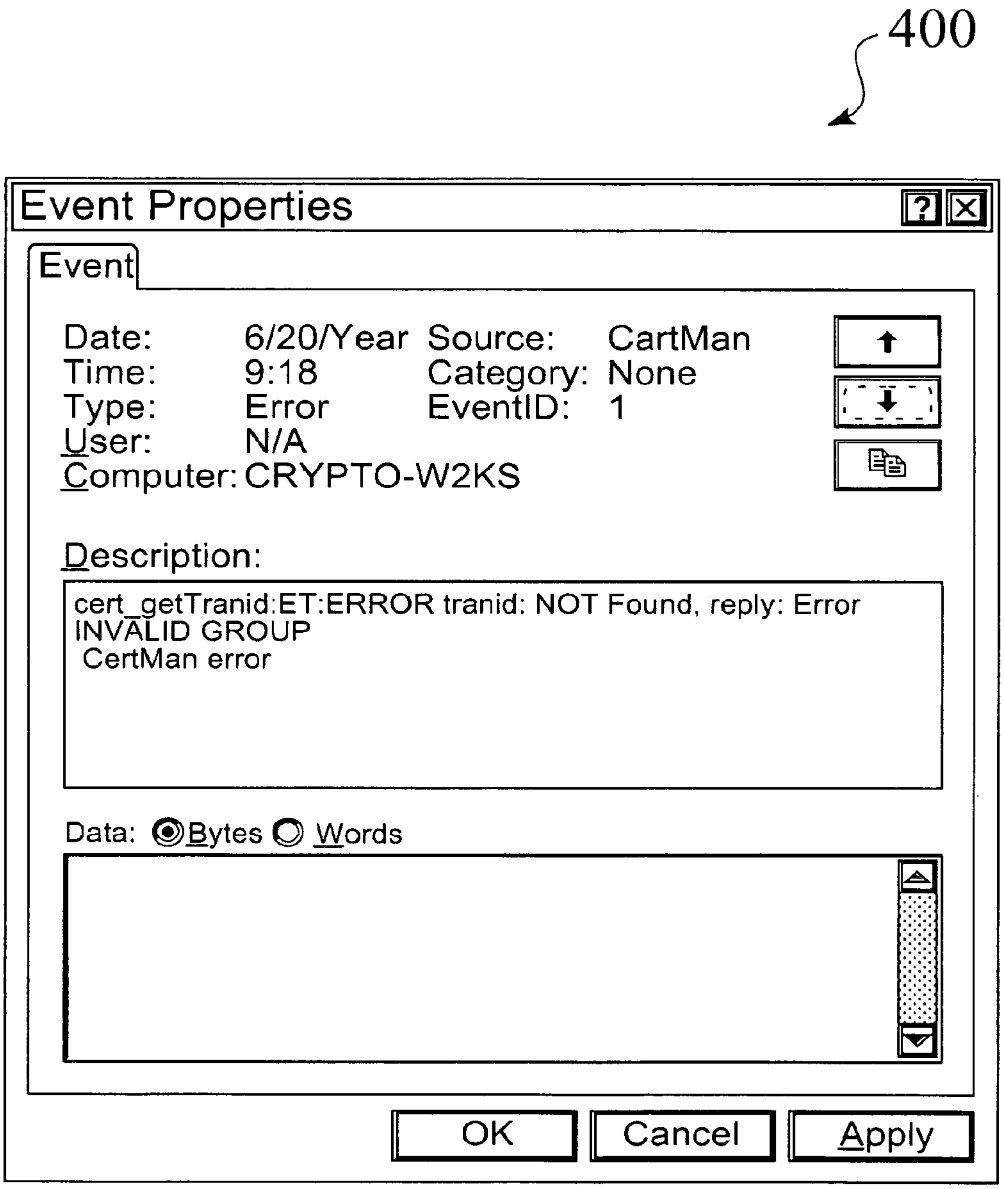
FIG. 22 shows an error-type event properties screen.

FIG. 22 shows an Error-type Event Properties Screen 400.

Certificate Manager Templates.

FIG. 23 shows a first portion of exemplary XML.template coding 410*a* for a distributed certificate management application 20. FIG. 24 shows a second portion of exemplary XML.template coding 410*b* for a distributed certificate management application 20.

Figure 25:
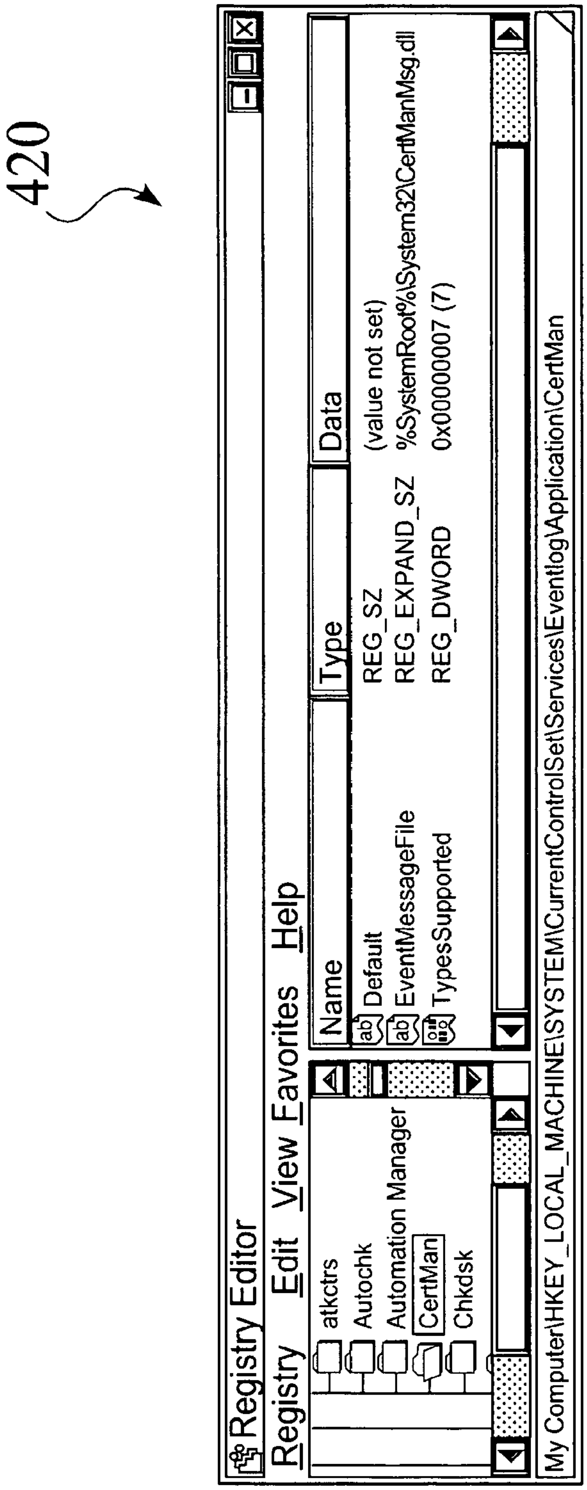
FIG. 25 shows the addition of a key into a registry within the certificate management service system.

FIG. 25 shows the addition of a key 56 into a registry 420 within a distributed certificate management application 20, as seen on the status line of the display 420.

Figure 26:
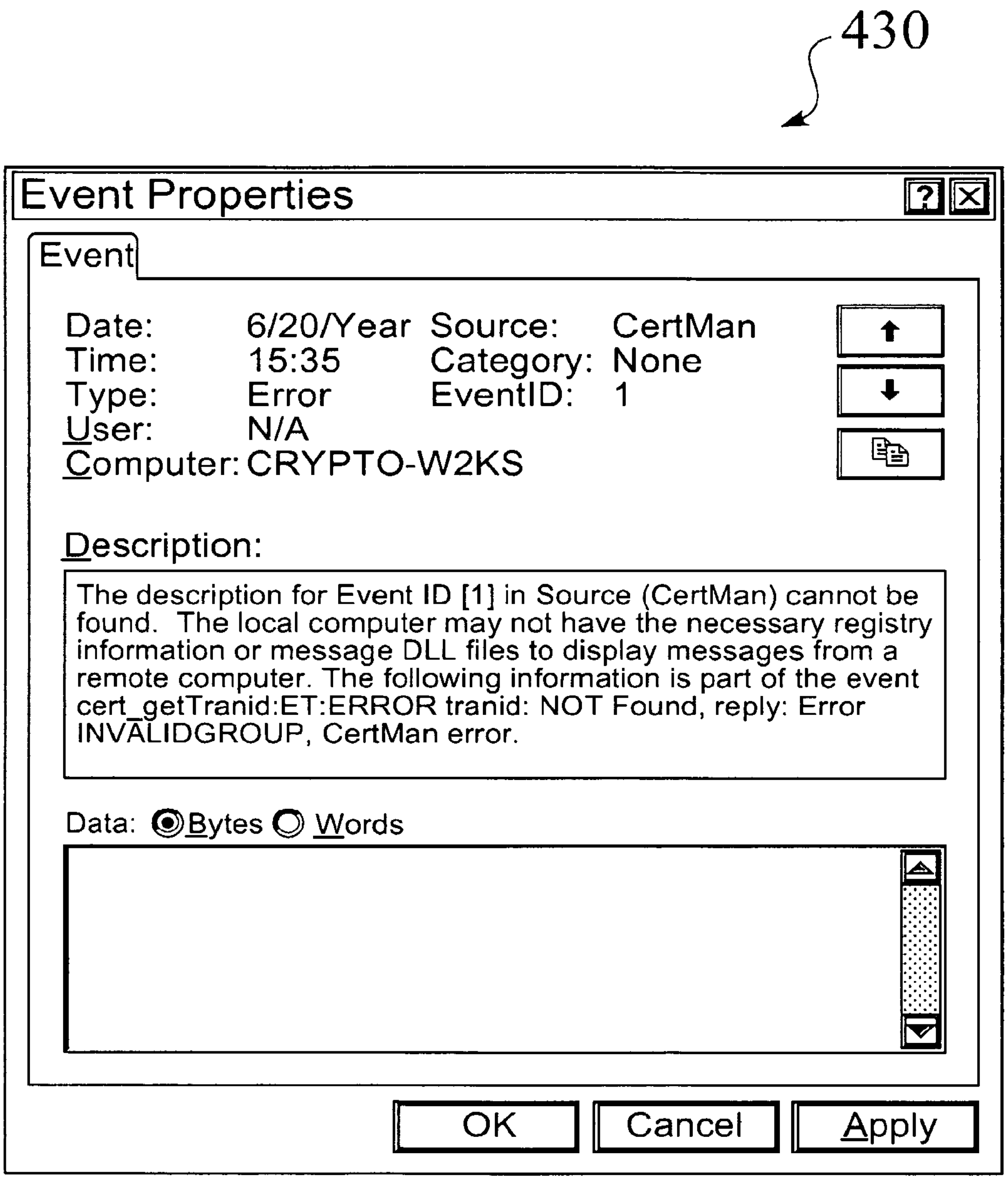
FIG. 26 shows an error-type event properties view of a distributed key management agent application.

If either the CertManMsg.dll is missing from % SystemRoot %\system32, or the above key 56 is missing from the Registry 420, the event log manager, such as provided by an operating system error logging location or file (e.g. a standard or generic error logging function on a UNIX or Windows™ operation system), typically notes that the Event ID is not found, while preferably still displaying the message, such as in the Error-type Event Properties View 430 seen in FIG. 26.

Start Up and Shut Down of Certificate Manager Application.

Figure 27:
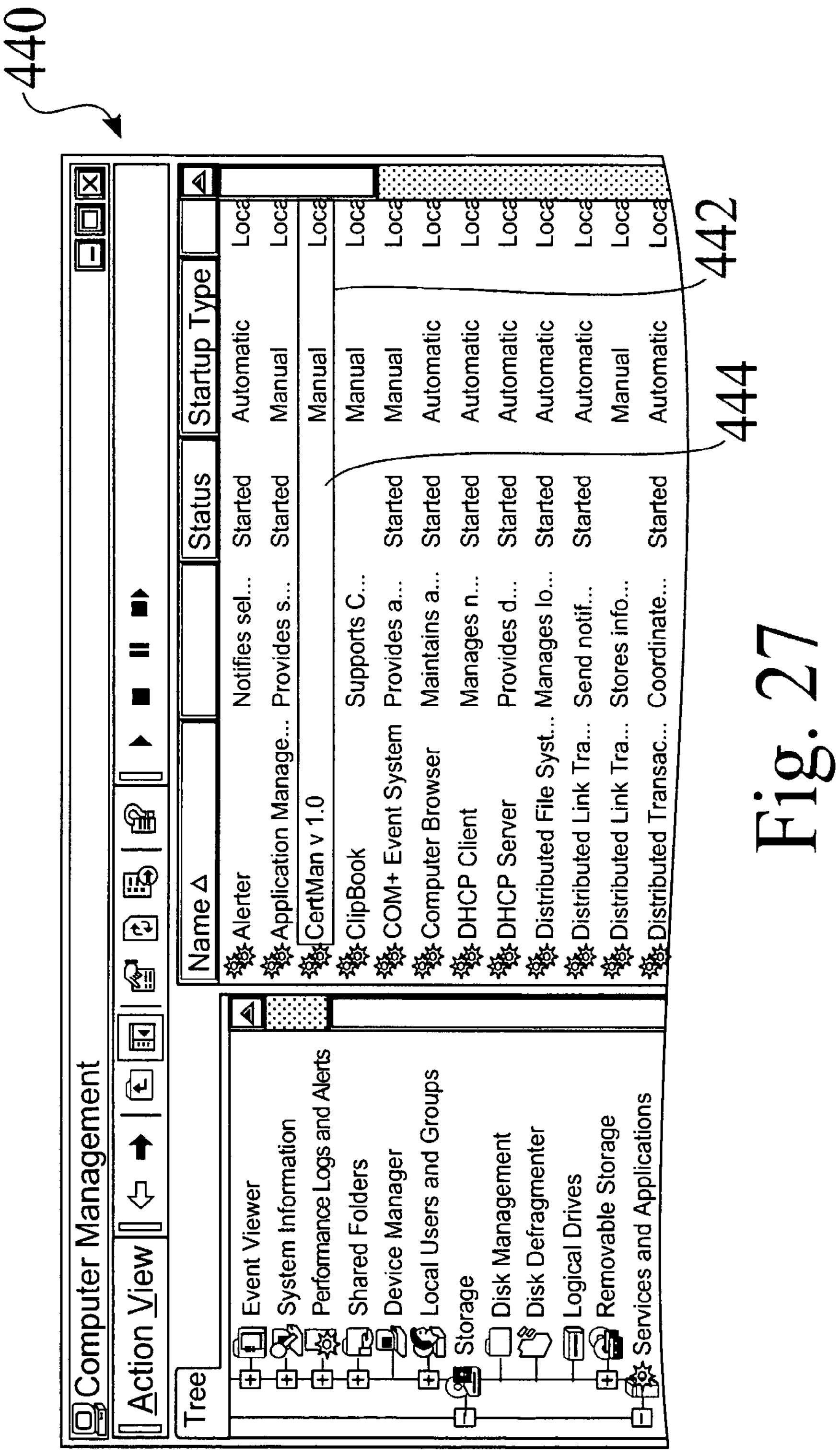
FIG. 27 shows an exemplary manual start up of the distributed key management agent application.
Figure 28:
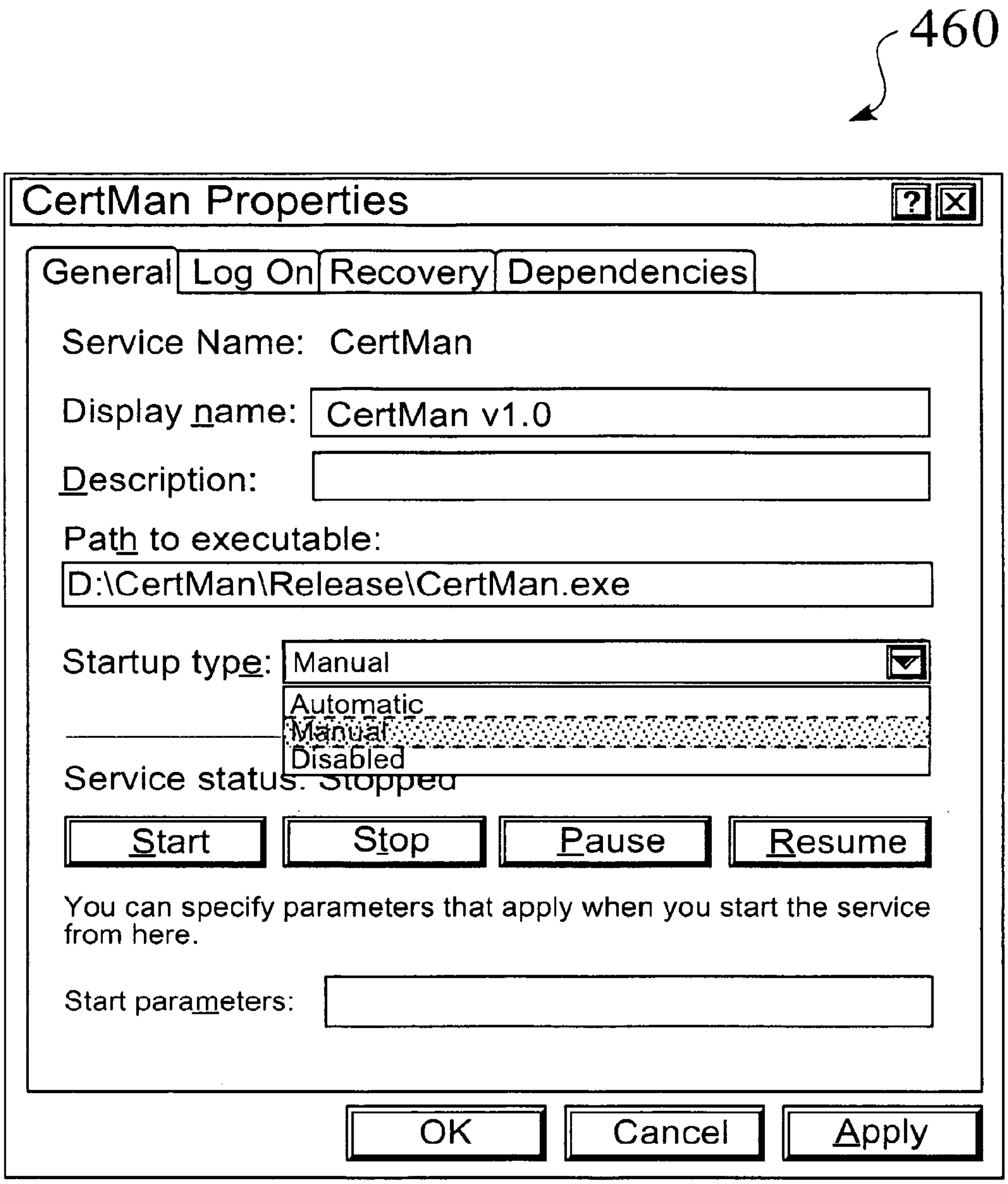
FIG. 28 shows an exemplary start/stop dialog box for a distributed key management agent application.

FIG. 27 shows directory navigation for a manual start up 430 of the distributed certificate management application 20, such as in a WIN2000 OS environment 57. A user, for example, may double-click the highlighted key management agent 20 seen in FIG. 27, to navigate to a start/stop dialog box 460 (FIG. 28) for a distributed key management agent 20. As seen in FIG. 28, a user can set the startup type 462 any of manual startup 466, Automatic startup 464, or disabled 468. If the startup type 462 is chosen as automatic 464, the service is started automatically.

Figure 29:
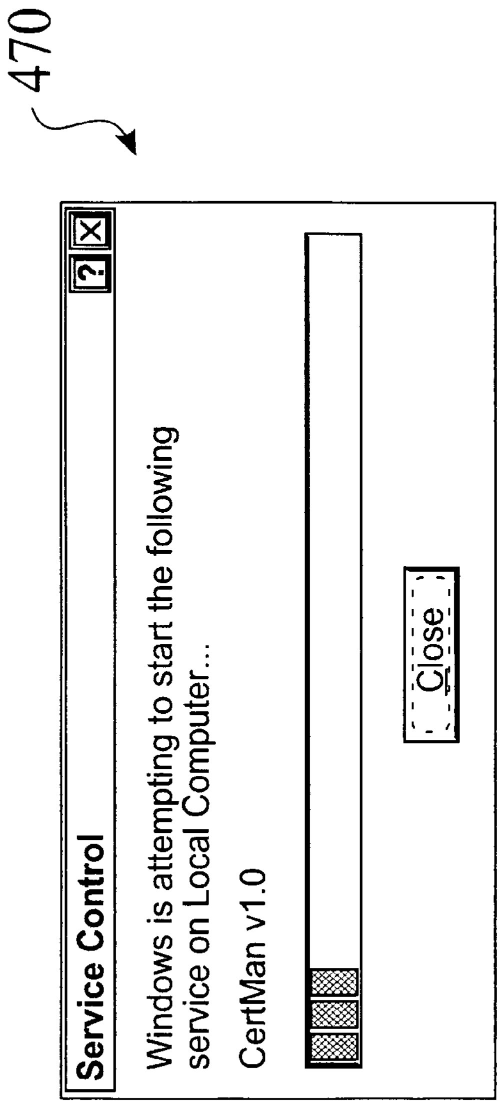
FIG. 29 shows a startup progress window for a distributed key management agent application.
Figure 30:
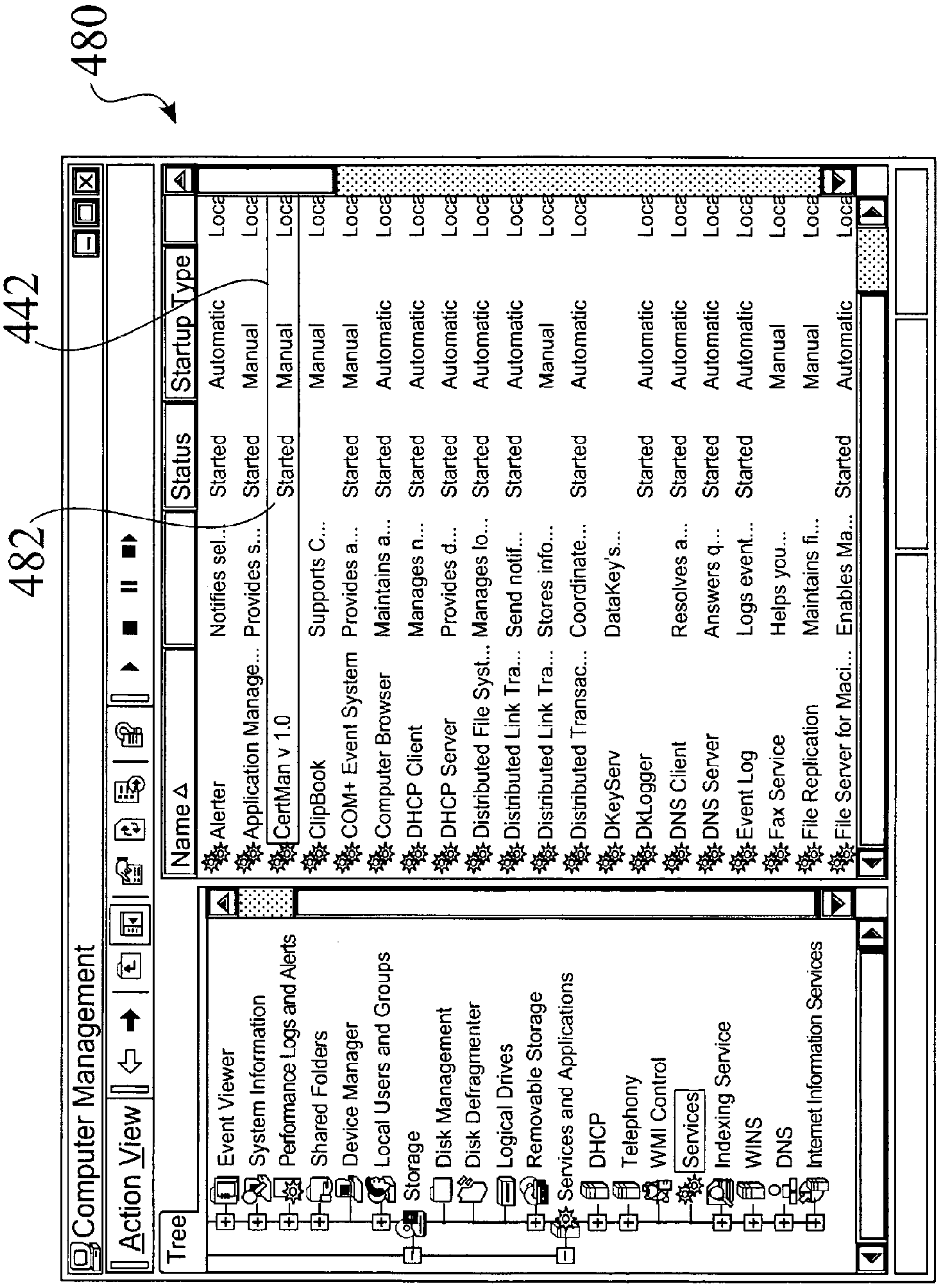
FIG. 30 shows a directory view a distributed key management agent application upon startup.

FIG. 29 shows a startup progress window 470 for a key management agent 20. FIG. 30 shows a directory view a key management agent 20 during operation 480, wherein a user may double-click the highlighted 442 CertMan agent 20 to navigate to the start/stop dialog box 460 (FIG. 28), such as to commence shut down of the key management agent 20.

System Advantages.

The distributed cryptographic key management system 10 provides centralized key management service enrollment 22, as well as real-time management.

The distributed key management agent 20 is typically distributed or implanted as an installable, independent, client software module, i.e. a plug-in, for subscribing client machine customers. The key management agent application 20 is typically independent of a web-application, and acts on behalf of a system administrator 54, to request keys 56 and key-store elements 58 for an application or applications.

This key management agent 20 is preferably purchased, requested, or installed by the administrator 54, such as through a web based interface 66 and configuration panels, in easily understood language, such as through a web site associated with a central key management service 22.

The administrator 54 typically requests the service by applying to the key management system 22.

Once an administrator 54 is vetted, i.e. appraised and accepted, the administrator 54 may request key management agent services for any client machines 12, e.g. servers and/or devices 12 under the administrators control or authority of the administrator 54.

The administrator 54 typically fills in the appropriate information into the key management configuration panel 66, such as but not limited to configuration elements, such as:

- hostnames for keys;
- key types;
- key strength;
- key authority;
- certificate policy types;
- event notification parameters;
- sensitivity of the keys;
- audit or logging parameters; and/or
- billing information.

The administrator 54 may also typically review the security architecture provided for one or more client machines 12, such as to regularly review SSL ports in a domain that may be using other certificates not belonging to them, to provide a non-intrusive port check.

The administrator 54 is typically passed a link to download the agent 20, with a configuration script to install on one or more client machines 12 for which the administrator 54 has enrolled. For example, as seen in FIG. 4, agent information 82 may be located on a server, available for download or distribution 84.

The key management agent 20 may comprise any of a plug-in, agent, software module, or application that performs agent functions. Once the key management agent 20 is installed on each of the desired client machines 12, the key management agent 20 preferably starts appropriately in the context of a server boot, and downloads its configuration from the central key management service 22. Thus, even if a client machine 12 has a disk failure or other major hardware problem, once the client machine 12 is turned back on and reconnected to its primary network 14, the key management agent 20 is always able to connect, download its configuration, and continue operating.

Once the key management agent 20 has downloaded its current configuration, the key management agent 20:

- checks the key stores it is configured to manage;
- generates requests for keys; and
- posts the key requests to the central key service, i.e. the CertMan hub 22.

The key management agent 20 continues to poll 102 the central service 22 at regular, configurable intervals, until all keys 56 and associated data 58 are:

- found by the agent 20;
- downloaded to the client machine 12 by the agent 20; and
- installed in the appropriate key store(s) 36 by the agent 20.

The key management agent 20 then checks 46 the keystores 36 periodically (which is typically configurable at enrollment time, or upon accessing the an installed key management agent 20), and sends status information to the central service 22.

At regular intervals depending on key validation periods, the key management agent 20 generates a renewal key request 106 to the central key management server 22, and polls again for the requested keys 56 and associated data 58 to be downloaded from the central key management service 22.

Status reports or updates are typically transmitted from the central service 22 to the administrator 54, i.e. the system customer 54, whereby status data and statistics are available to the administrator 54 from the central key management service 22.

The distributed cryptographic management system 10 provides a combination of enrollment services and registration services for keys, comprises a central key management service 22 and an independent key management agent 12, which acts on behalf of the administrator, i.e. customer 54.

The distributed cryptographic management system 10 provides a process of enrolling or registering an electronic entity, such as a device 12 or an application resident on a device 12, for cryptographic key lifecycle management, such that the identity of the device or application 12 is vouched for by a trusted enroller, e.g. such as an approving entity 53 or an approving administrator 54, and is regularly certified for continued validity.

In some embodiments, the key management software application, i.e. agent 20 acts under the authority and rights of the subject application administrator or device administrator 54, to query a key management repository 22 for allowed and/or configured keys 56 and/or digital certificates 180. The key management agent 20 generates the appropriate keys 56, stores the keys in the appropriate application or device keystore files/directories 36, protects those keys 56 using a variety of passphrase elements 148 (FIG. 6) unique to the device 12 and to the key management system 10, monitors the status of the keystore 36 for expiry or corruption, sends regular status information to the central key management system 22, and typically requests renewal of keys 56 and/or certificates 108 at a pre-assigned schedule, based on rules in the central key management system 22.

The keystore 36 on the subject device 12 is protected by a variety of security mechanisms, as assigned in the subject key profile stored on the central key management system 22. These security mechanisms typically comprise standard file protection as available in the subject file systems, as well as encrypted storage in a file using a key derived from a selection of one or more of a set of data elements unique to the device 12 or application on which the key is physically located. The security mechanisms also preferably comprise an "agent" key value, such as assigned to that instance of the installed key management agent 20 by the central key service 22.

Various embodiments of the central key management system 10 are typically configurable to provide any or all of the following functions:

- Hosting of "agent" object packages for various systems, so that the package can be downloaded when the subject application/device 12 is accepted as a legitimate object in the key management system domain 10;
- Hosting the function of configuring domain "registrars", i.e. approving entities, 53 who are allowed to pre or post authorize subscribing applications/devices 12 to join the key management domain 10 (each "registrar" will only have access to approve and manage those devices within their defined sub-domain;
- Allowing key deletion, revocation, suspension and/or reissue of specific subject keys by a specific administrator role 54 for the entire key management domain;
- Allowing an "audit" role with view access to records pertaining to the entire key management domain;
- Presenting an online enrollment form 66 for the device/subject "Agent" profiling for all keys/certificates to be allowed for the subject domain;
- Presenting configuration options for key request, key maintenance, regular status, notification, and alerts for each subject (the system preferably allows profiling at either a "registrar" level, or the individual key level, and takes actions using these parameters as well as other parameters within the central key management system 10);

Collecting status data coming from agents 20, and presents that data to "registrars" 53, key management systems administrators 54, and/or auditors through configured reports; and Sending alerts to help desks or monitoring centers through standards based alert mechanisms, such as SNMP.

While the certificate management system 10 is disclosed above providing distributed certificate management for client machines, the distributed management system can alternately be used for a wide variety of security architectures, such as but not limited to symmetric cryptography systems and asymmetric cryptography systems. As well, the certificate management system 10 can be implemented for a wide variety of key and certificate structures.

Furthermore, while the certificate management system 10 is disclosed above providing distributed certificate management for client machines 12 implemented over a network 14, the system can alternately be implemented over a wide variety of networks other than the exemplary network architecture provided.

Although the certificate system and its methods of use are described herein in connection with client machines operating across a network, such as computers, servers, wireless devices, personal computers and other microprocessor-based devices, such as wireless appliances, the structure and techniques can be implemented for a wide variety of electronic devices and systems, or any combination thereof, as desired.

Furthermore, while the certificate management system and its methods of use are described herein in connection with computing devices and intranets or LAN's, the apparatus and techniques can be implemented for a wide variety of electronic devices and networks or any combination thereof, as desired.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A distributed cryptographic management system implemented across a network, comprising:

a central key management service accessible through the network and having a database associated therewith;

an approval module, executed by a computing device, programmed to receive approval for any of client machines connectable to the network and applications associated with the client machines, the database storing records for the client machines, and a key management domain being defined by all approved client machines and applications;

an agent module programmed to provide key management agents, wherein the key management agents are transferable and installable on any of the approved client machines and applications within the key management domain;

one or more domain registrars programmed to pre-authorize or post-authorize subscribing client machines or applications to join the key management domain, wherein the domain registrars have access to approve and manage client machines or applications within a defined sub-domain of the key management domain;

an online enrollment form accessible through the network for input of any of client machine profiling, application profiling, and agent profiling for any of keys and certificates to be allowed for the allowed client machine or application;

a presentation module programmed to present the collected status data to any of registrars and administrators; and an alert module programmed to send alerts associated with the collected status data to any of help desks and monitoring centers accessible through the network.

2. The distributed cryptographic management system of claim 1, further comprising an administrator having access to the network, wherein at the administrator provides any of key deletion, key revocation, key suspension, and key reissue of specific subject keys for the entire key management domain.

3. The distributed cryptographic management system of claim 2, further comprising an auditor having access to the network, wherein at the auditor can access any of the records and status for the key management domain.

4. The distributed cryptographic management system of claim 1, further comprising an auditor having access to the network, wherein at the auditor can access any of the records and status for the key management domain.

5. The distributed cryptographic management system of claim 1, wherein the approval module is further programmed to establish configuration options for any of key requests, key maintenance, regular status, notification, and alerts for each subject.

6. The distributed cryptographic management system of claim 1, wherein the agent module is further programmed to collect status data from key management agents.

* * * * *